(12) United States Patent
Nishimura et al.

(10) Patent No.: US 11,424,915 B2
(45) Date of Patent: Aug. 23, 2022

(54) TERMINAL REGISTRATION SYSTEM AND TERMINAL REGISTRATION METHOD WITH REDUCED NUMBER OF COMMUNICATION OPERATIONS

(71) Applicant: Nippon Telegraph and Telephone Corporation, Tokyo (JP)

(72) Inventors: Hideo Nishimura, Tokyo (JP); Takao Yamashita, Tokyo (JP); Yasuhiko Yoshimura, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/267,915

(22) PCT Filed: Aug. 1, 2019

(86) PCT No.: PCT/JP2019/030237
§ 371 (c)(1),
(2) Date: Feb. 11, 2021

(87) PCT Pub. No.: WO2020/036070
PCT Pub. Date: Feb. 20, 2020

(65) Prior Publication Data
US 2021/0320790 A1    Oct. 14, 2021

(30) Foreign Application Priority Data
Aug. 13, 2018 (JP) .............................. JP2018-152271

(51) Int. Cl.
*H04L 9/08* (2006.01)
*H04L 9/32* (2006.01)

(52) U.S. Cl.
CPC .......... *H04L 9/0847* (2013.01); *H04L 9/0819* (2013.01); *H04L 9/0861* (2013.01); *H04L 9/3263* (2013.01)

(58) Field of Classification Search
CPC ... H04L 9/0847; H04L 9/0819; H04L 9/0861; H04L 9/3263
(Continued)

(56) References Cited

U.S. PATENT DOCUMENTS 8,885,457 B2 * 11/2014 Kadakia .................. H04L 43/50
370/216
10,728,044 B1 * 7/2020 Melo ..................... H04L 63/083
(Continued)

OTHER PUBLICATIONS

Fidoalliance.org, [online], "Simpler, Stronger Authentication," 2018, retrieved on Jun. 26, 2018, retrieved from URL<https://fidoalliance.org/>, 5 pages.
(Continued)

*Primary Examiner* — Bryan F Wright
(74) *Attorney, Agent, or Firm* — Fish & Richardson P.C.

(57) ABSTRACT

[Problem] A terminal registration system and a terminal registration method that enable the number of communication operations between terminals to be reduced are provided.
[Solution] The terminal registration system 1000 includes an existing terminal A110 including, in a secure area including a TEE, a certificate issuing unit 117 configured to issue an owner certificate indicating the owner of the terminal, an existing terminal-side coordination unit 114 configured to coordinate terminals having an owner certificate identical to the issued owner certificate and generate a cryptographic key, an authentication key management unit 116 configured to manage an authentication private key, and including, in a terminal environment including an REE, an inter-terminal coordination app 111 configured to perform inter-terminal communication, a new terminal B120 makes a request for starting encrypted communication using a cryptographic key to the existing terminal A110 from an inter-terminal coordination app 121 on the new terminal B120 side, and the
(Continued)

existing terminal-side coordination unit 114 of the existing terminal A110 sends coordination data with the authentication private key encrypted with the cryptographic key to the new terminal B120 having the identical owner certificate.

12 Claims, 18 Drawing Sheets

(58) Field of Classification Search
USPC .......................................................... 713/171
See application file for complete search history.

(56) References Cited

U.S. PATENT DOCUMENTS

| | | | |
|---|---|---|---|
| 10,887,113 B2* | 1/2021 | Queralt | ............... H04L 63/0823 |
| 2015/0318986 A1* | 11/2015 | Novak | ................ G06F 9/45558 |
| | | | 713/189 |
| 2018/0006829 A1* | 1/2018 | Kravitz | ................. H04W 12/06 |

OTHER PUBLICATIONS

Iida et al., "The Proposal of a PKI-based System Design for IoT," CSS2016 Computer Security Symposium 2016 Proceedings, 2016, 2016(2):602-608, 15 pages (with English Translation).

Nishimura et al., "A Study on the Secure Sharing of User Authentication Private Keys among Devices Belonging to the Same Owner," IEICE, Technical Report, 2017, 116(485):449-454, 19 pages (with English Translation).

* cited by examiner

TERMINAL REGISTRATION SYSTEM AND TERMINAL REGISTRATION METHOD WITH REDUCED NUMBER OF COMMUNICATION OPERATIONS

CROSS-REFERENCE TO RELATED APPLICATIONS

This application is a National Stage application under 35 U.S.C. § 371 of International Application No. PCT/JP2019/030237, having an International Filing Date of Aug. 1, 2019, which claims priority to Japanese Application Serial No. 2018-152271, filed on Aug. 13, 2018. The disclosure of the prior application is considered part of the disclosure of this application, and is incorporated in its entirety into this application.

TECHNICAL FIELD

The present invention relates to a terminal registration system and a terminal registration method.

RELATED ART

As a user authentication technology replacing authentication by password, there is a web service user authentication technology using public key cryptography which is a de-facto standard technology of password-less authentication (Fast Identity Online: FIDO) (see NPL 1). In FIDO, a different pair of a public key and a private key is generated for each service, then the public key is installed in the service site side, and the private key is locked in the terminal. The use of the private key (signatures in challenge-response authentication) is on the premise of performing biometric authentication on the terminal, use of the private key takes place within authenticators, and the private key is not allowed to be revealed outside the terminal, which increases security.

In order to make use FIDO authentication, a terminal needs to be pre-registered in the service site and the public key of the terminal needs to be associated with the account. In standard technology, registration is assumed to be performed upon logging into an account in an authentication method other than FIDO.

FIG. 14 is a diagram illustrating features of the standard technology (FIDO), FIG. 14(a) illustrates authentication of a terminal, and FIG. 14(b) illustrates registration of a new terminal. As illustrated in FIG. 14(a), the terminal 1 is controlled for access using biometric authentication or the like. The terminal 1, a service site A21, and a service site B22 are authenticated using a FIDO protocol. A user has accessed the service site A21 and the service site B22 using the terminal 1.

The service site A21 and the service site B22 register individual keys for each terminal. In addition, the terminal 1 generates a separate key pair for each site.

A public key A is registered in the service site A21, and a public key B is registered in the service site B22.

A secure area (Authenticator) 10 of the terminal 1 stores a private key B that will be paired with the public key A.

FIG. 14(b) is a diagram illustrating registration of a new terminal in the standard technology (FIDO). A terminal 2 in FIG. 14(b) is a new terminal (hereinafter referred to as a new terminal 2) that is added separately from the terminal 1. The new terminal 2 appears by adding or changing the terminal (e.g., carrying two devices including a smart phone and a tablet terminal, or changing the model of the terminal). In order to make use of FIDO authentication with the new terminal 2, the terminal needs to be pre-registered in all service sites and a public key of the terminal needs to be associated with the account.

As illustrated in FIG. 14(b), when the new terminal 2 is used, there is no key in the authenticator 10 of the new terminal 2, and thus it is necessary to generate and register a key pair again for each service.

In the standard technology (FIDO), private keys for authentication are locked in the terminal to enhance security. When a terminal is to be added and changed, there is a problem in terms of convenience that a key of a new terminal needs to be registered again for all service sites.

As a solution to this problem, there are methods 1 and 2 using inter-terminal coordination.

FIG. 15 is a diagram for describing a technology of copying an authentication key (first method) by using inter-terminal coordination.

As illustrated in FIG. 15, a secure communication path 3 is established between the existing terminal 1 and a new terminal 2, and an authentication key is duplicated via the secure communication path 3.

The coordination of both terminals (the duplication of the private key between terminals) enhances the convenience of re-registration for multiple sites.

FIG. 16 is a diagram for describing a registration authorization technology (second method) using a grant of an electronic signature.

As illustrated in FIG. 16, a secure communication path 3 is established between an existing terminal 1 and a new terminal 2, and authorization information is granted (granting an electronic signature) via the secure communication path 3. Registration authorization is performed by granting an electronic signature to a service site 20 at the time of initial access.

The coordination of both terminals (the registration authorization by granting an electronic signature) enhances the convenience of re-registration for multiple sites.

In the above-described first and second methods using inter-terminal coordination, there is concern that an attacker may launch an attack to coordinate the attacker's own terminal (new terminal) with a terminal (existing terminal) of a user to take over the user's account.

As a countermeasure against such attacks, a method in which an electronic certificate (owner certificate) indicating the owner of the terminal is issued to the secure area of the terminal (Trusted Execution Environment: TEE) to allow only terminals having the identical owner certificate to be coordinated has been proposed.

FIG. 17 is a diagram for describing a third method for allowing only terminals having the identical owner certificate to be coordinated.

Owner certificates 11 are stored in secure areas 10 of the terminals. The owner certificate 11 is an electronic certificate issued by a trusted third party after confirming the owner's authenticity. The owner certificate 11 is assumed to be issued by a trusted third party after confirming the user's authenticity using a highly reliable means such as a face-to-face authentication.

Mutual authentication using the owner certificate 11 enables the secure communication path 3 to be established when the user is confirmed to be identical to the owner. That is, mutual authentication using the owner certificates 11 of both terminals is performed, and only when it is confirmed that the owners match, a secure communication path between the terminals is established to allow their coordination.

CITATION LIST

Non Patent Literature

NPL 1: FIDO Alliance, "SIMPLER, STRONGER AUTHENTICATION," FIDO is the World's Largest Ecosystem for Standards-Based, Interoperable Authentication [online], Internet (https://fidoalliance.org/) [retrieved Aug. 8, 2018],

SUMMARY OF THE INVENTION

Technical Problem

It is assumed that authentication keys of FIDO are managed strictly within secure areas, such as a TEE to which malware or the like cannot intrude, and in order to keep the security level, it is desirable to implement a function of establishing a secure communication path between terminals as a secure application within the TEE. Also, Transport Layer Security (TLS) is widely used as a general standard protocol for establishing secure communication paths based on mutual authentication using electronic certificates.

However, in comparison to a normal terminal environment such as Android (trademark) (Rich Execution Environment: REE), only limited execution environments are provided for TEEs, and the cost for implementing a secure application that fully implements a TLS protocol is assumed to be high. In particular, if TLS, which is a general client-server mutual authentication protocol, is implemented as is, the number of communication operations between terminals increases. Communication is generally performed in the REE, and it is assumed that state management being conscious of context switches between the TEE and the REE becomes complicated. Note that a state of a CPU is referred to as a context, and switching a context by storing and returning to the state of the CPU is referred to as a context switch.

In light of the foregoing, an object of the present invention is to provide a terminal registration system and a terminal registration method that enable the number of communication operations between terminals to be reduced.

Means for Solving the Problem

To solve the above-described problems, the invention according to claim 1 is a terminal registration system in which a plurality of terminals to be authenticated with Fast Identity Online (FIDO) using a private key are communicatively connected to a service site that is utilized by the terminals and a new terminal is registered in a plurality of the service sites using a registered terminal, in which each of the terminals includes, in a secure area including a Trusted Execution Environment (TEE), a certificate issuing unit configured to issue an owner certificate indicating an owner each of the terminals, a coordination unit configured to coordinate terminals having an owner certificate identical to the issued owner certificate, a cryptographic key generation unit configured to generate a cryptographic key, and an authentication key management unit configured to manage an authentication private key, and includes, in a terminal environment including a Rich Execution Environment (REE), a communication unit configured to perform inter-terminal communication, the new terminal making a request for starting encrypted communication using the cryptographic key to the registered terminal from the communication unit of the new terminal side, and the coordination unit of the registered terminal sending coordination data with the authentication private key encrypted with the cryptographic key to the new terminal having the same owner certificate.

In addition, the invention according to claim 7 is a terminal registration method of a terminal registration system in which a plurality of terminals to be authenticated with Fast Identity Online (FIDO) using a private key are communicatively connected to a service site that is utilized by the terminals and a new terminal is registered in a plurality of the service sites using a registered terminal, in which each of the terminals includes, in a secure area including a Trusted Execution Environment (TEE), a certificate issuing unit configured to issue an owner certificate indicating an owner of each of the terminals, a coordination unit configured to coordinate terminals having an owner certificate identical to the issued owner certificate, a cryptographic key generation unit configured to generate a cryptographic key, and an authentication key management unit configured to manage an authentication private key, and includes, in a terminal environment including an REE, a communication unit configured to perform inter-terminal communication, the method including: at the new terminal, making a request for starting encrypted communication using the cryptographic key to the registered terminal from the communication unit of the new terminal side, and at the coordination unit of the registered terminal, sending coordination data with the authentication private key encrypted with the cryptographic key to the new terminal having the identical owner certificate.

In this manner, the required number of communication operations is at most one round-trip between the terminals in one operation (in the inter-terminal certificate exchange process and the inter-terminal coordination process). Thus, the number of states in the TEE taking a context switch to the REE into account is reduced.

The invention according to claim 2 is the terminal registration system according to claim 1, in which the coordination unit has a threshold for determining the number of communication start requests made within a predetermined period of time, and the coordination unit of the registered terminal does not send the coordination data when the number of communication start requests from the new terminal exceeds the threshold.

With this configuration, an attack to steal an authentication key by acquiring a large number of pieces of encrypted data and deducing the method of generating cryptographic keys can be prevented.

The invention according to claim 3 is the terminal registration system according to claim 1, in which the coordination unit of the registered terminal sends the coordination data without confirming that the cryptographic key is available on the new terminal side.

With this configuration, the number of communication operations between the terminals can be reduced compared to that in TLS.

The invention according to claim 4 is the terminal registration system according to claim 2, in which the coordination unit further includes a presentation section configured to give a notification to a user when the number of communication start requests from the new terminal exceeds the threshold, and a reception section configured to receive a determination of acceptance or rejection by the user.

With this configuration, the possibility of erroneous operation or the like by the user can be eliminated. The warning screen of the TEE cannot be tampered by malware or the like, and thus the user's intention can b securely ascertained.

The invention according to claim 5 is the terminal registration system according to claim 1, in which, at the time of a coordination process, the coordination unit notifies a user of the new terminal under the coordination process.

With this configuration, there is an effect that it is more likely to recognize an attempt of an unintended terminal to coordinate.

The invention according to claim 6 is the terminal registration system according to claim 1, in which the certificate issuing unit of the registered terminal stores a name of the new terminal named by a user in association with the owner certificate.

With this configuration, when an other's certificate is acquired, the user can securely give an easy-to-understand name by which the terminal is identifiable.

Effects of the Invention

According to the present invention, it is possible to provide a terminal registration system and a terminal registration method that enable the number of communication operations between the terminals to be reduced.

DESCRIPTION OF EMBODIMENTS

Hereinafter, a terminal registration system and the like according to an embodiment for implementing the present invention (hereinafter referred to as "the present embodiment") will be described with reference to the drawings.

First, the relationship between the present invention and the related-art technology will be described.

Figure 18:
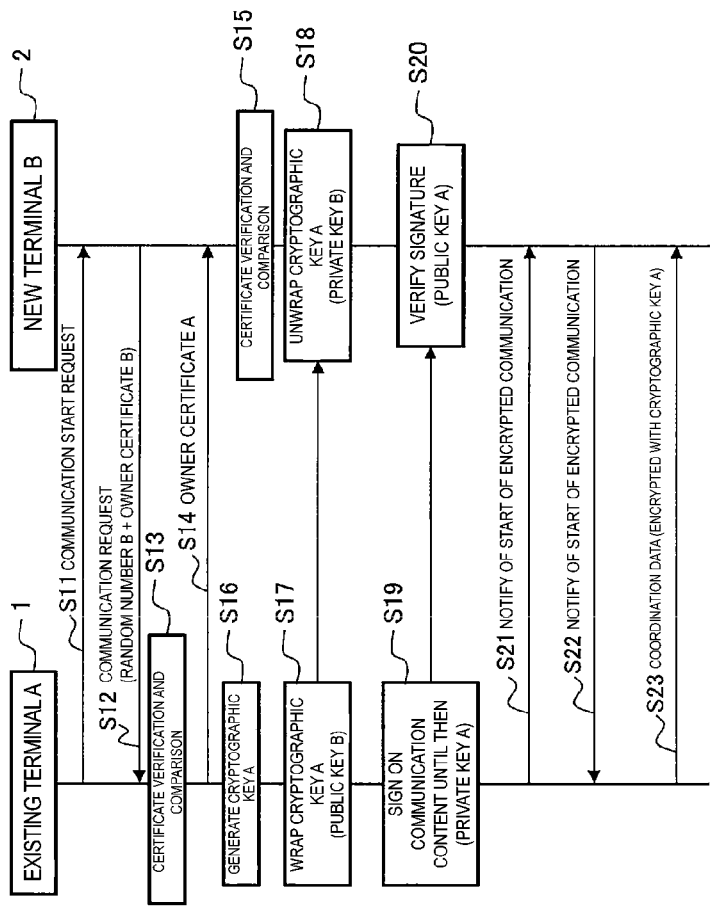
FIG. 18 is a sequence diagram in a case in which mutual authentication between terminals is implemented based on standard TLS.

FIG. 18 is a sequence diagram in the case in which mutual authentication between terminals is implemented based on standard TLS.

In FIG. 18, it is assumed that terminal 1 is an existing terminal A (hereinafter, referred to as an existing terminal A1), and terminal 2 is a new terminal B (hereinafter, referred to as a new terminal B2).

The new terminal B2 is, for example, an addition or a change (e.g., carrying two devices including a smart phone and a tablet terminal, or changing the model of the terminal). In this case, in the FIDO standard, the new terminal B2 is newly required to generate a new key pair and to be associated with each Web service (Registration). However, it becomes complicated. Therefore, by duplicating a private key of the existing terminal A1, the execution of Registration at the new terminal B2 is avoided.

For the sequence, a client side in the TLS, that is, the existing terminal A1 here, starts communication. The existing terminal A1 transmits a communication start request to the new terminal B2 (step S11).

The new terminal B2 generates a random number and send a communication request (random number B+owner certificate B) to prevent replay attacks (step S12).

The existing terminal A1 verifies and compares the certificate sent from the new terminal B2 (step S13). If the verification of the certificate is OK, an owner certificate A is transmitted to the new terminal B2 (step S14).

The new terminal B2 verifies and compares the certificate sent from the existing terminal A1 (step S15).

After the existing terminal A1 transmits the owner certificate A, the existing terminal A1, which is the side sending coordination data, generates a cryptographic key A (step S16).

The existing terminal A1 wraps the cryptographic key A with a public key B that is associated with the received owner certificate B (step S17).

The new terminal B2 unwraps the cryptographic key A with a private key B associated with the owner certificate B to prove that the user of the owner certificate B is communicating (step S18).

The existing terminal A1 signs on the content communicated until then with a private key A associated the owner certificate A to prove that the user of the owner certificate A is communicating (step S19).

The new terminal B2 verifies the signature with a public key A to confirm that the user of the owner certificate A is the communication partner (step S20).

The existing terminal A1 notifies the new terminal B2 of starting of encrypted communication (step S21).

In response to the notification of start from the existing terminal A1, the new terminal B2 notifies the existing terminal A1 of the start of the encrypted communication using the unwrapped cryptographic key A (step S22).

The existing terminal A1 can confirm that the user of the owner certificate B is the communication partner due to the notification of start from the new terminal B2.

The existing terminal A1 starts actual data communication and transmits coordination data encrypted with the cryptographic key A (step S23).

The sequence for implementing mutual authentication between the terminals based on the standard TLS has been described above.

In the standard TLS, the TLS that is a general client-server mutual authentication protocol is implemented as is. As illustrated in FIG. 18, because the TLS is implemented as is, the number of communication operations between the terminals increases. In addition, communication is generally performed in an REE, and state management taking a context switch between a TEE and the REE into consideration is assumed to be complicated.

Here, general limitations on supposable TEE app development will be described.
(1) Standard library groups available during TEE app implementation are limited.
(2) Implementing TEE apps in C languages is a prerequisite. Thus, more productive and advanced development languages (such as Java, Python, and the like.) are hard to use.
(3) Preparing a separate distribution server from that for REE apps is a prerequisite. For this reason, updating of the TEE apps is costly.

Embodiment

Figure 1:
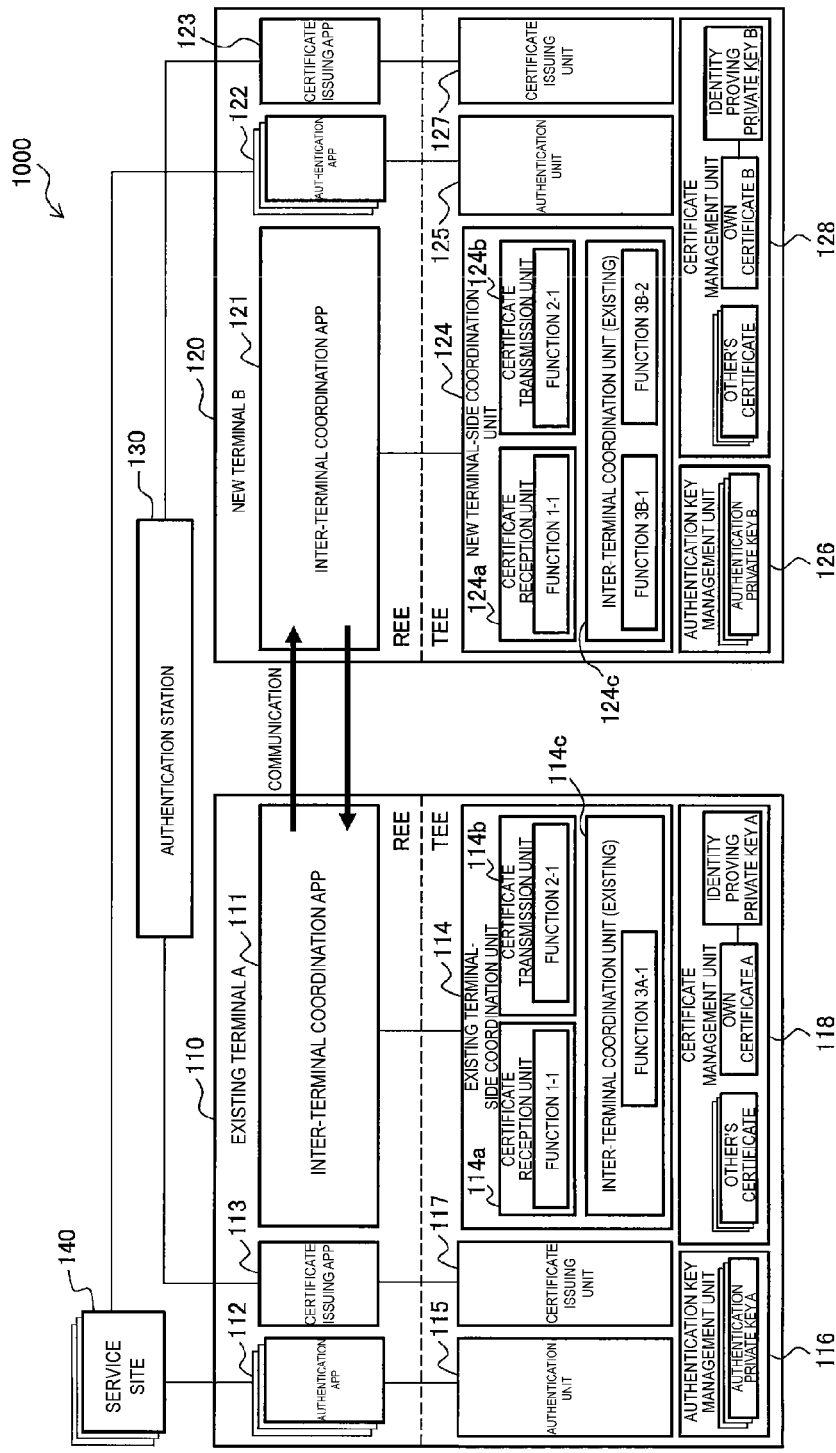
FIG. 1 is a configuration diagram illustrating a terminal registration system according to an embodiment of the present invention.

FIG. 1 is a configuration diagram illustrating a terminal registration system according to an embodiment of the present invention.

Overall Configuration of Terminal Registration System

As illustrated in FIG. 1, the terminal registration system 1000 according to the present embodiment includes, in addition to an existing terminal A110 (registered terminal) and a new terminal B120, an authentication station 130 that issues public key certificates to other entities, and a service site 140 on a network.

In the terminal registration system 1000, a plurality of terminals that perform FIDO authentication using private keys and the service site 140 used by the terminals are communicatively connected, and the new terminal B120 with respect to the service site 140 is registered using the existing terminal A110.

Note that the existing terminal A110, the new terminal B120, the authentication station 130, and the service site 140 are connected by a communication network (not illustrated) to be capable of communicating with each other.

Service Site 140

The service site 140 includes a web application server and a FIDO server. The web application server is a web server with a software execution environment and coordination function, and the like. The web application server has a function of connecting and coordinating with the FIDO server to perform complex processing. The web application server is, for example, a web server operated by a service provider running an electronic commerce (EC) site, and performs registration and authentication of users who are using the service.

Configuration of Existing Terminal A110 and New Terminal B120

The existing terminal A110 and the new terminal B120 are authentication terminals, and may be, for example, mobile terminals such as smartphones, mobile phones, or tablets, notebook/desktop PCs, and various electronic devices. In this embodiment, smartphones are taken as an example. The existing terminal A110 and the new terminal B120 each logically include a normal terminal environment (REE), which is an area in which a normal application (hereinafter referred to as an app) or the like operates, and a secure area (TEE) managed to prevent malware or the like from entering. An REE is an environment in which a general application program is executed. Also, a TEE is a secure area in which biometric information (such as fingerprint information) is stored. The TEE is implemented in a privileged mode of a central processing unit (CPU) or an operating system (OS) to allow invocation of a program and access to data of the TEE only through a specific program or a specific procedure.

First, a configuration of the existing terminal A110 will be described.

The REE of the existing terminal A110 has an inter-terminal coordination app 111 (communication unit), an authentication app 112, and a certificate issuing app 113.

As indicated by the arrow in FIG. 1, the inter-terminal coordination app 111 of the existing terminal A110 communicates with an inter-terminal coordination app 121 of the new terminal B120 using REEs.

The TEE of the existing terminal A110 includes an existing terminal-side coordination unit 114 that coordinates it with a terminal having an identical owner certificate, an authentication unit 115 that is connected to the authentication app 112, an authentication key management unit 116 that manages an authentication private key, a certificate issuing unit 117 that is connected to the certificate issuing app 113 and issues an owner certificate indicating the owner of the terminal, and a certificate management unit 118.

The existing terminal-side coordination unit 114 includes, as an existing terminal-side coordination function group, a certificate reception unit 114*a* that receives a certificate in accordance with a function 1-1 (described below), a certificate transmission unit 114*b* that transmits a certificate in accordance with a function 2-1 (described below), and an inter-terminal coordination unit 114*c* that performs an inter-terminal coordination according to a function 3A-1 (described below). The functions described above refer to functions of each unit performing a specific operation or processing in a control sequence for the sake of convenience.

In addition, the existing terminal-side coordination unit 114 has a function of a cryptographic key generation unit that generates a cryptographic key.

The existing terminal-side coordination unit 114 has a threshold for determining the number of communication start requests made within a predetermined period of time, and does not send coordination data when the number of communication start requests from the new terminal B120 exceeds the threshold.

The existing terminal-side coordination unit 114 sends coordination data without confirming that a cryptographic key is available on the new terminal B120 side.

The existing terminal-side coordination unit 114 performs exchange, verification, and comparison of the owner certificates with the terminal prior to coordination with the terminal.

The existing terminal-side coordination unit 114 further includes a presentation section that give a notification to a user when the number of communication start requests from the new terminal B120 exceeds the threshold, and a reception section that receives a determination of acceptance/rejection by the user.

The existing terminal-side coordination unit 114 notifies the user of a new terminal under a coordination process at the time of a coordination process.

The authentication key management unit 116 has an authentication private key A that is a key for each service site 140 (e.g., an asymmetric key of RSA, or the like).

The certificate issuing unit 117 issues an owner certificate indicating the owner of the terminal. The certificate issuing unit 117 stores the name of the new terminal given by the user in association with the owner certificate.

The certificate management unit 118 manages an identity proving private key A, an own certificate A, and the others' certificates.

The above own certificate A is a public key certificate (e.g., in the X.509 format) of its own terminal and the identity proving private key A is a private key that is associated with the public key certificate. The others' certificates are saved public key certificates (e.g., in the X.509 format) of other terminals.

Next, a configuration of the new terminal B120 will be described. The new terminal B120 employs a configuration similar to that of the existing terminal A110.

The REE of the new terminal B120 has the inter-terminal coordination app 121 (communication unit), an authentication app 122, and a certificate issuing app 123.

As indicated by the arrow in FIG. 1, the inter-terminal coordination app 121 of the new terminal B120 communicates with the inter-terminal coordination app 111 of the existing terminal A110 using the REEs.

The TEE of the new terminal B120 includes a new terminal-side coordination unit 124 that coordinates it with a terminal having an identical owner certificate, an authentication unit 125 that is connected to the authentication app 122, an authentication key management unit 126 that manages an authentication private key, a certificate issuing unit 127 that is connected to the certificate issuing app 123 and issues an owner certificate indicating the owner of the terminal, and a certificate management unit 128.

The new terminal-side coordination unit 124 includes, as a new terminal-side coordination function group, a certificate reception unit 124*a* that receives a certificate in accordance with a function 1-1 (described below), a certificate transmission unit 124*b* that transmits a certificate in accordance with a function 2-1 (described below), and an inter-terminal coordination unit 124*c* that performs an inter-terminal coordination according to a function 3A-1 (described below).

The authentication key management unit 126 has an authentication private key A that is a key for each service site 140 (e.g., an asymmetric key of RSA, or the like).

The certificate management unit 128 manages an identity proving private key B, an own certificate B, and the others' certificates.

The own certificate A is a public key certificate (e.g., in the X.509 format) of its own terminal and the identity proving private key B is a private key that is associated with this public key certificate. The others' certificates are saved public key certificates (e.g., in the X.509 format) of other terminals.

A terminal registration method of the terminal registration system configured as described above will be described below.

Operation Overview

First, an operation overview of the terminal registration method of the terminal registration system according to the present embodiment will be described.

The terminal registration system according to the present embodiment is configured to reduce the number of communication operations between terminals in comparison to that of the sequence diagram for the TLS (see FIG. 18) by focusing on the use case of mutual authentication between terminals performed for setting up a new terminal.

A supposable use case and simplified points are as follows.

(1) Terminals are assumed to be in an equal relationship. In other words, neither terminals are a client nor a server, but they are equal. Thus, a process of making a request to start communication from the client is omitted.

(2) A frequency of inter-terminal coordinations is not so high. Execution of inter-terminal coordinations is limited to a case in which a new terminal is started to be used or a case in which either terminal is registered in a new website and keys of the terminals need to be synchronized.

(3) After the number of communication requests made within a given period of time is limited, coordination data is sent without confirming whether the cryptographic key is available on the other side.

(4) Only specific terminals are coordinated (i.e., this is not a model in which a server accepts communication from a majority of unidentified clients). As a prerequisite, exchange, verification, and comparison of the owner certificates between the terminals are assumed to be performed in advance rather at the time of coordination.

Furthermore, in the terminal registration system according to the present embodiment, the number of communication requests made within a given period of time is limited to avoid the risk of disturbance in order not to allow a malicious third party to collect data. The reason for this is because, if the configuration of the present embodiment is adopted to set the terminals in an equal relationship without providing the limitations described above, in a case in which the new terminal B is used by a malicious user, there is a risk of disturbance by the new terminal B increasing. Note that there is no such problem in a case in which the same person carries both the existing terminal A and the new terminal B, and switches the existing terminal A to the new terminal B to register a key. Furthermore, in a case in which a communication start request is initiated from the existing terminal A, there is no concern of an attack being received even if the new terminal B is used by a malicious user.

Figure 2:
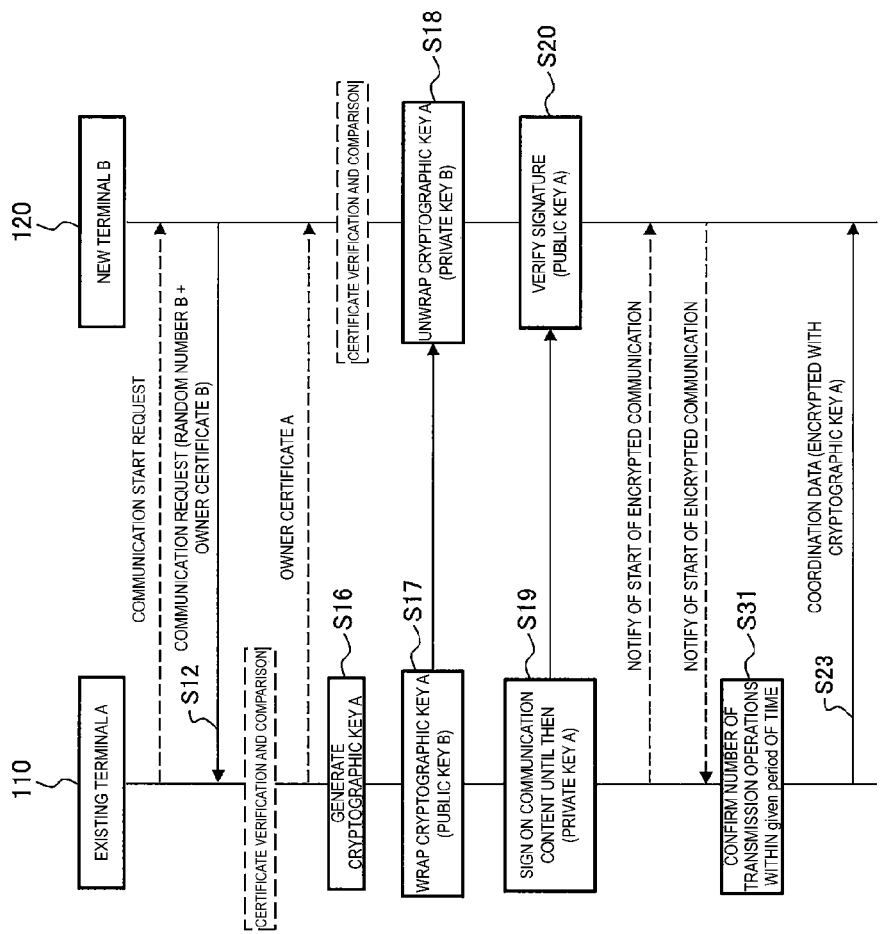
FIG. 2 is a sequence diagram in a case in which mutual authentication between terminals in the terminal registration system according to the present embodiment is implemented.

FIG. 2 is a sequence diagram in a case in which mutual authentication between the terminals is implemented in the terminal registration system according to the present embodiment.

In FIG. 2, the sequence for performing the same processing as the sequence diagram illustrated in FIG. 18 is given the same step number.

In FIG. 2, the processing blocks and communication procedures reduced in contrast to FIG. 18 are indicated by dashed lines. In other words, although the processing blocks and communication procedures indicated by the dashed lines in FIG. 2 are reduced and not present, they are described for convenience of explanation.

Although the TLS standard enables communication to be started from the client that generates the cryptographic key, in the use case of the inter-terminal coordination of the terminal registration system according to the present embodiment, the server side (the side accepting the cryptographic key A), that is, the new terminal B2 here, starts communication. In other words, there is no communication start request (step S11 in FIG. 18 described above) from the existing terminal A1 indicated by the dashed line in FIG. 2. The new terminal B2 generates a random number and sends a communication request (random number B+owner certificate B) to prevent replay attacks (step S12). "Terminals are in an equal relationship" of (1) described above is applied.

Next, step S13, step S14, and step S15 of FIG. 18 are omitted by applying "only specific terminals are coordinated" of (4) above. As a prerequisite, exchange and verification of the owner certificates are assumed to have been performed in advance between the terminals that are likely to be coordinated with each other.

The existing terminal A1 immediately generates the cryptographic key A without transmitting the owner certificate A to the new terminal B2 as in the sequence of TLS standards (step S16).

The existing terminal A1 wraps the cryptographic key A with the public key that is associated with the received owner certificate B (step S17).

The new terminal B2 unwraps the cryptographic key A with a private key associated with the owner certificate B to prove that the user of the owner certificate B is communicating (step S18).

The existing terminal A1 signs on the content communicated until then with a private key A associated the owner certificate A to prove that the user of the owner certificate A is communicating (step S19).

The new terminal B2 verifies the signature with a public key A to confirm that the user of the owner certificate A is the communication partner (step S20).

Although, in the TLS standard, a start of encrypted communication is notified of from the client that generates the cryptographic key and the client receives a notification of start from the server, in the sequence of inter-terminal coordination of the terminal registration system according to the present embodiment, such notification of start of encrypted communication between the client and the server is omitted (step S21 and step S22 in FIG. 18 are omitted). In other words, the cryptographic keys can be exchanged with each other until step S20 described above. Because a third party does not have the cryptographic key, therefore is not able to unwrap the authentication private key, it is thought that, even if the third party sends data prior to sending a key, the third party would not be able to decrypt keys.

However, cryptographically, the security level would slightly decrease. In the terminal registration system according to the present embodiment, in order to lower a frequency of re-registration of the keys, reduce a likelihood of receiving an attack, and prevent a malicious third party from collecting data, the number of communication requests made within a given period of time is limited, and thus risks can be avoided.

In order to "limit the number of communication requests made within a given period of time" (which will be described below) of (3) described above, the existing terminal A1 confirms the number of transmission operations within a given period of time (step S31).

The existing terminal A1 starts actual data communication and transmits coordination data encrypted with the cryptographic key A (step S23).

The limitation on the number of communication requests made within a given period of time described above (step S31) will be described.

Approach to Reduction of Number of Communication Operations

In the sequence of the inter-terminal coordination of the terminal registration system according to the present embodiment, encrypted communication using the cryptographic key A is started without giving a notification of a start of the encrypted communication (confirming whether the cryptographic key A has been successfully unwrapped by the new terminal B2). The reason that encrypted communication using the cryptographic key A can be started without giving a notification of a start of the encrypted communication is that even if the partner is a terminal of an attacker without the private key B, the attacker cannot decrypt the coordination data unless it can unwrap the cryptographic key A. However, the following risk remains.

Remaining Risk

Suppose that the new terminal B2 is a malicious terminal. The new terminal B2, which is an attacker, makes a communication request many times, and acquires a large number of pieces of encrypted coordination data. Thus, the new terminal B2 can attempt to estimate the rule of generating the cryptographic key A.

Countermeasures for Above Risk

In the present embodiment, a threshold of the number of communication request that may be made by the existing terminal A within a given period of time is set, and when a value exceeds the threshold, the request is rejected (step S31).

The sequence of an inter-terminal coordination of the terminal registration system according to the present embodiment has been described above.

Actions and Effects

Next, actions and effects of the terminal registration system according to the present embodiment will be described.

Comparative Example

Figure 3:
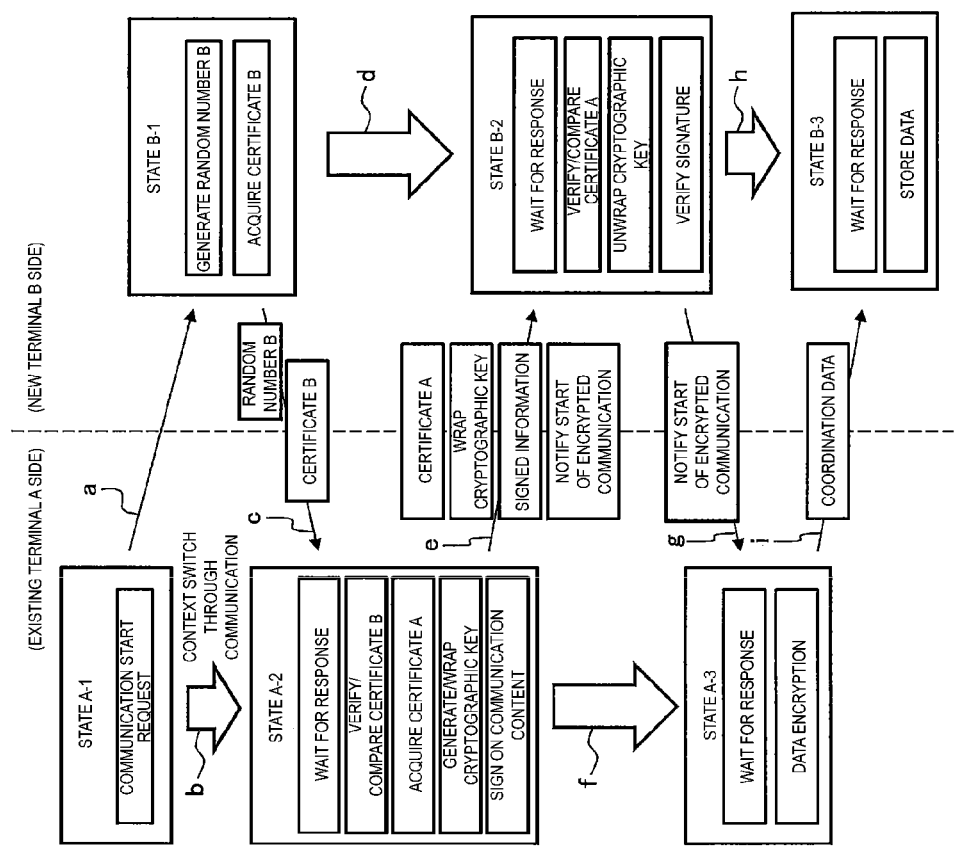
FIG. 3 is a state transition diagram illustrating a required state of a TEE in a case in which the TLS standard of a comparative example has been implemented.

FIG. 3 is a state transition diagram illustrating a required state of a TEE in a case in which the TLS standard of a comparative example has been implemented. In FIG. 3, the left side represents a state of the existing terminal A side, and the right side represents a state of the new terminal B side.

In the TEE in a case in which the TLS standard is implemented, the existing terminal A side and the new terminal B side perform an inter-terminal coordination process. In other words, it is premised that the existing terminal A side and the new terminal B side perform an inter-terminal coordination process.

In a state A-1 on the existing terminal A side, a communication start request is issued to the new terminal B side (see reference sign a in FIG. 3). In addition, a context switch using communication is performed to transition to a state A-2 (see reference sign b in FIG. 3).

On the new terminal B side, a state B-1 occurs as it is triggered by the communication start request from the existing terminal A side. In the state B-1 on the new terminal B side, a random number B is generated and a certificate B is acquired, and the random number B and the certificate B are sent to the existing terminal A side (see reference sign c in FIG. 3) and the state transitions to a state B-2 (see reference sign d in FIG. 3).

In the state A-2 on the existing terminal A side, a response from the new terminal B side is awaited, verification/("/" indicates "and/or," and the same applies hereinafter) comparison of the certificate B, acquisition of a certificate A, generation/wrapping of a cryptographic key, and singing the communication content are performed, the certificate A, the wrapped cryptographic key, signed information, and a encrypted communication initiation notification are sent to the new terminal B side (see reference sign e in FIG. 3) and the state transitions to a state A-3 (see reference sign f in FIG. 3).

In the state B-2 on the new terminal B side, the certificate A, the wrapped cryptographic key, the signed information, and the encrypted communication start notification are received from the existing terminal A side. In the state B-2, a response from the existing terminal A side is awaited, verification/comparison of the certificate A, unwrapping of the cryptographic key, and verification of the signature are performed, an encrypted communication start notification is sent to the existing terminal A side (see reference sign g in FIG. 3) and the state transitions to a state B-3 (see reference sign h in FIG. 3).

In the state A-3 on the existing terminal A side, a response from the new terminal B side is awaited, data is encrypted, and coordination data is sent to the new terminal B side (see reference sign i in FIG. 3).

In the state B-3 on the new terminal B side, a response from the existing terminal A side is awaited, and the received coordination data is stored.

Note that the state transition ends in the state A-3 on the existing terminal A side and the state B-3 on the new terminal B side.

Embodiments

Figure 4:
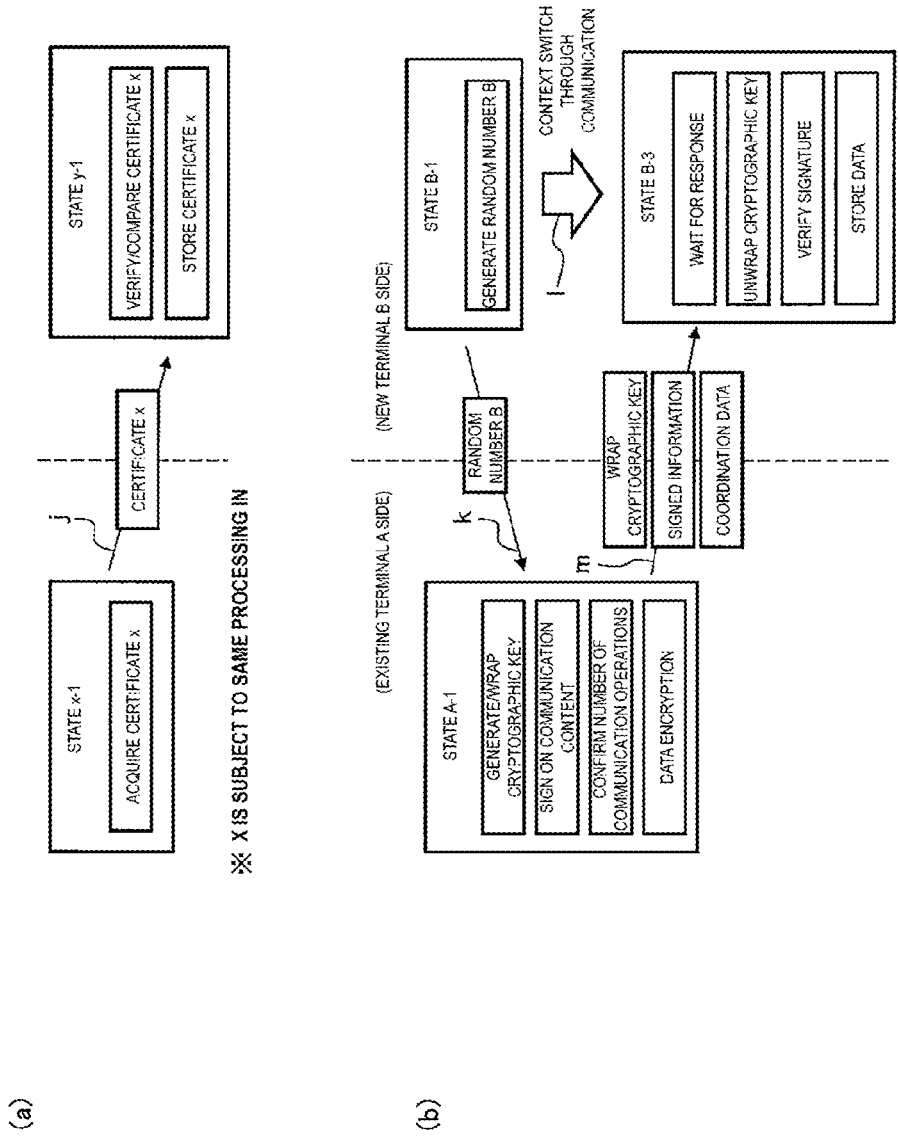
FIG. 4 illustrates state transition diagrams illustrating required states of a TEE in the terminal registration system according to the present embodiment, in which (a) illustrates a process of exchanging a certificate between terminals, and (b) illustrates a process of coordinating terminals.

FIG. 4 illustrates a state transition diagram illustrating required states of the TEE of the terminal registration system according to the present embodiment, FIG. 4(a) illustrates a process of exchanging a certificate between terminals, and FIG. 4(b) illustrates an inter-terminal coordination process. In FIGS. 4(a) and (b), the left side represents a state of the existing terminal A side, and the right side represents a state of the new terminal B side.

Processes in the terminal registration system according to the present embodiment are divided into an inter-terminal certificate exchange process and an inter-terminal coordination process.

The inter-terminal certificate exchange process illustrated in FIG. 4(a) is performed only once for each terminal pair. Note that the state x in FIG. 4(a) indicates that the same processing is performed on the existing terminal A side and the new terminal B side.

As illustrated in FIG. 4(a), in a state x-1 on one terminal side, a certificate x is acquired and this certificate x is sent to a state y-1 on the other terminal side.

In the state y-1 on the other terminal side, the certificate x is verified/compared and stored.

For example, in a case in which one terminal side is the existing terminal A side, the certificate x is acquired in the state x-1 on the existing terminal A side, and this certificate x is sent in the state y-1 on the new terminal B side (see reference sign j in FIG. 4(a)). In the state y-1 on the new terminal B side, the certificate x is verified/compared and stored. Such a certificate exchange process is performed only once for each terminal pair.

As illustrated in FIG. 4(b), a state B-1 on the new terminal B side starts in the inter-terminal coordination process. The reason for starting the state B-1 on the new terminal B side has been described in the sequence for starting communication from the new terminal B2 on the side receiving the cryptographic key in FIG. 2.

In the state B-1 on the new terminal B side, the random number B is generated and the generated random number B is sent to the existing terminal A side (see reference sign k in FIG. 4(b)), and a context switch is performed through communication to transition to a state B-3 (see reference sign 1 in FIG. 4(b)).

In the state A-1 on the existing terminal A side, generation/wrapping of a cryptographic key, signing a communication content, confirming the number of communication operations, and data encryption are performed using the received random number B, and the wrapped cryptographic key, signed information, and coordination data are sent to the new terminal B side (see reference sign m in FIG. 4(b)).

In the state B-3 on the new terminal B side, a response is awaited from the existing terminal A side, the cryptographic key is unwrapped, the signature is verified, and the data is stored.

Note that the state transition ends in the state A-1 on the existing terminal A side and the state B-3 on the new terminal B side.

As can be seen by comparing the comparative example illustrated in FIG. 3 and the present embodiment illustrated in FIG. 4, the required number of communication operations is at most one round-trip between the terminals in one operation (including the inter-terminal certificate exchange process and of the inter-terminal coordination process) in the present embodiment, Thus, the number of states in the TEE taking a context switch to the REE into account is reduced.

Examples

Hereinafter, examples of the present embodiment will be described.

The owner certificate issue sequence (see FIG. 5), the service site key registration (see FIG. 6), and the service site authentication sequence (see FIG. 7) are applied to the related-art technology without change. In the related-art technology, the existing terminal A110 and the new terminal B120 perform the same processing. Thus, processing of the existing terminal A110 will be described as a representative example.

Owner Certificate Issuing Sequence

The owner certificate issuing sequence is for issuing an owner certificate (own certificate) to a terminal following a general electronic certificate issuing procedure.

Figure 5:
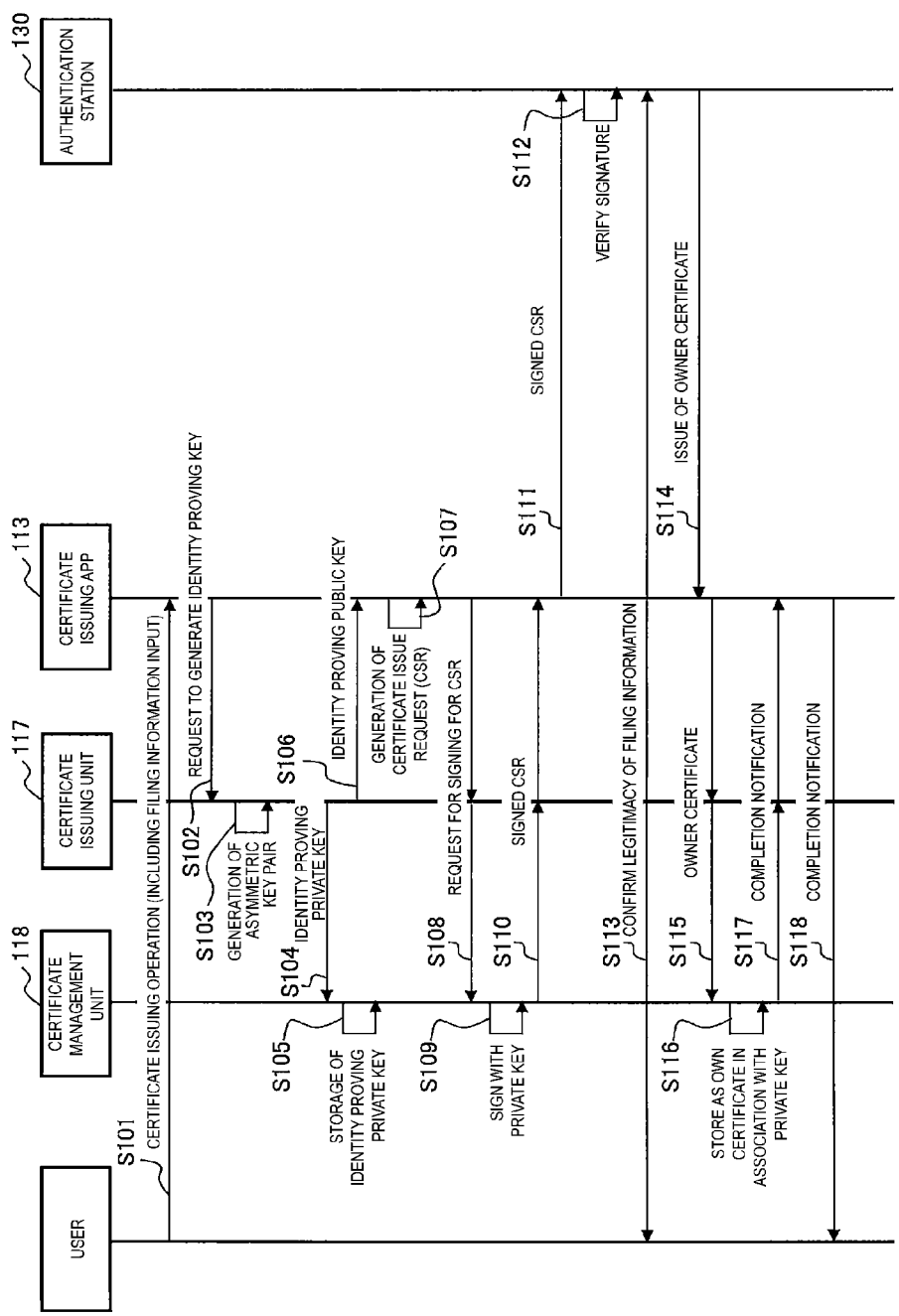
FIG. 5 is a diagram illustrating an owner certificate issuing sequence in the terminal registration system according to the present embodiment.

FIG. 5 is a diagram illustrating the owner certificate issuing sequence.

A user performs a certificate issuing operation including input of application information (step S101). The user operation for the certificate issue is received by the certificate issuing app 113. The certificate issuing app 113 sends a request to generate an identity proving key to the certificate issuing unit 117 (step S102).

The certificate issuing unit 117 generates an asymmetric key pair (step S103).

The certificate issuing unit 117 sends an identity proving private key to certificate management unit 118 (step S104).

The certificate management unit 118 stores the identity proving private key sent from the certificate management unit 118 (step S105).

The certificate issuing unit 117 sends an identity proving public key to the certificate issuing app 113 (step S106).

The certificate issuing app 113 generates a certificate issue request (certificate signing request: CSR) (step S107).

The certificate issuing app 113 sends a request to sign the CSR to the certificate management unit 118 via the certificate issuing unit 117 (step S108).

The certificate management unit 118 signs with the private key (step S109).

The certificate management unit 118 sends the signed CSR to certificate issuing app 113 via the certificate issuing unit 117 (step S110).

The certificate issuing app 113 sends the signed CSR to the authentication station 130 (step S111).

The authentication station 130 verifies the signature (step S112).

The authentication station 130 confirms the legitimacy of the application information by confirming the identification of the user with the face of the user or the like (step S113).

When the authentication station 130 confirms the legitimacy of the application information, the authentication station issues the owner certificate to the certificate issuing app 113 (step S114).

The certificate issuing app 113 sends the owner certificate to the certificate management unit 118 via certificate issuing unit 117 (step S115).

The certificate management unit 118 stores the owner certificate as an own certificate in association with the private key (step S116).

The certificate management unit 118 sends a completion notification to the certificate issuing app 113 via the certificate issuing unit 117 (step S117).

The certificate issuing app 113 sends the completion notification to the user (step S118).

Service Site Key Registration

A public key of a terminal is registered in the service site 140 based on the authentication method defined by the FIDO UAF.

The present registration process may only be performed by any one of terminals owned by a user (here referred to as the existing terminal A110). The other terminal (here, the new terminal B120) performs the inter-terminal coordination process, which will be described below, to be able to use the private key generated by the existing terminal A110, and a process of newly registering a public key generated by the new terminal B120 is unnecessary.

Figure 6:
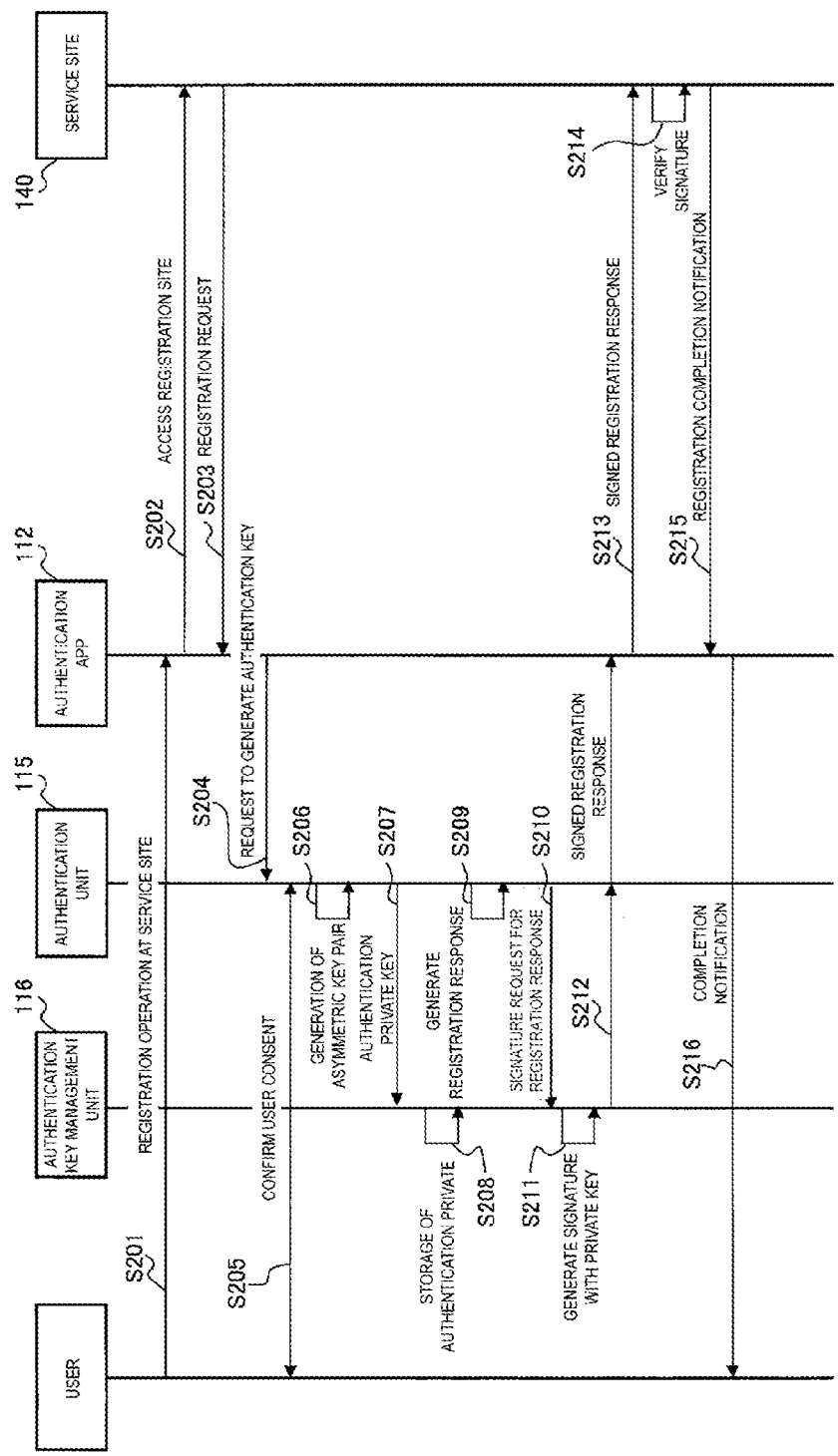
FIG. 6 is a sequence diagram illustrating key registration at a service site in the terminal registration system according to the present embodiment.

FIG. 6 is a sequence diagram illustrating key registration at a service site.

The user performs a registration operation on the service site 140 with the authentication app 112 (step S201).

The authentication app 112 accesses a registration site of the service site 140 (step S202).

The service site 140 sends a registration request to the authentication app 112 (step S203).

The authentication app 112 sends an authentication key generation request to the authentication unit 115 (step S204).

The authentication unit 115 confirms a consent of the user (step S205).

The authentication unit 115 generates an asymmetric key pair (step S206).

The authentication unit 115 sends an authentication private key to the authentication key management unit 116 (step S207).

The authentication key management unit 116 stores the authentication private key (step S208).

The authentication unit 115 generates a registration response (step S209).

The authentication unit 115 sends a signing request to the registration response (step S210).

The authentication key management unit 116 generates a signature with the private key (step S211).

The authentication key management unit 116 sends a signed registration response to the authentication app 112 via the authentication unit 115 (step S212).

The authentication app 112 replies to the service site 140 with the signed registration response (step S213).

The service site 140 verifies the signature (step S214).

The service site 140 sends a registration completion notification to the authentication app 112 (step S215).

The authentication app 112 sends a completion notification to the user (step S216).

Authentication at Service Site

Authenticate at the service site is performed based on the authentication method (challenge-response authentication) defined by the FIDO UAF.

Figure 7:
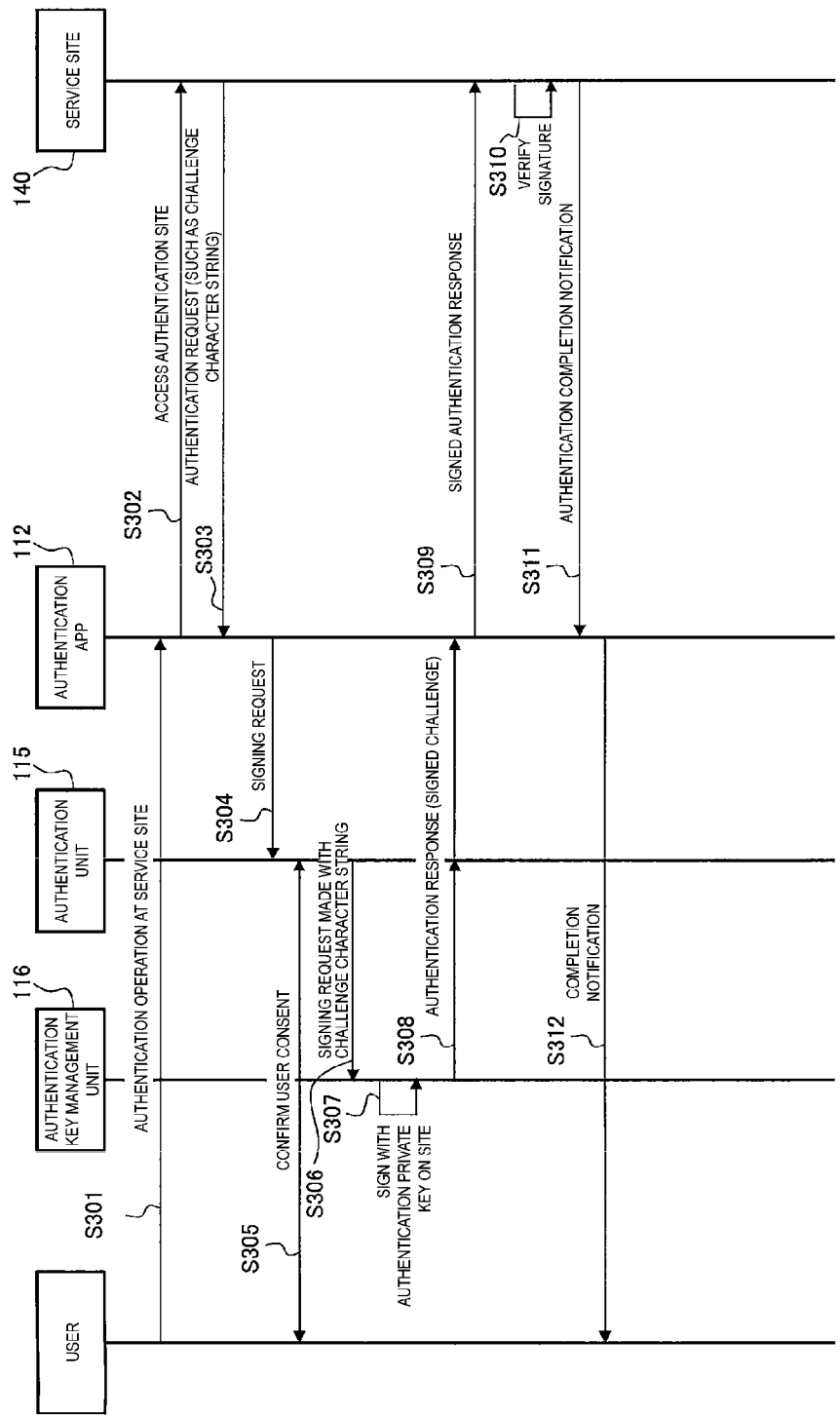
FIG. 7 is a sequence diagram illustrating authentication at a service site in the terminal registration system according to the present embodiment.

FIG. 7 is a sequence diagram illustrating authentication at the service site.

The user performs an authentication operation for the service site on the authentication app 112 (step S301).

The authentication app 112 accesses the authentication site of the service site 140 (step S302).

The service site 140 sends an authentication request made with a challenge character string or the like to the authentication app 112 (step S303).

The authentication app 112 sends a signing request to the authentication unit 115 (step S304).

The authentication unit 115 confirms a consent of the user (step S305).

The authentication unit 115 sends a signing request for the challenge character string to the authentication key management unit 116 (step S306).

The authentication key management unit 116 signs with an authentication private key corresponding to the site (step S307).

The authentication key management unit 116 makes an authentication response with the signed challenge to the authentication app 112 via the authentication unit 115 (step S308).

The authentication app 112 sends a signed authentication response to the service site 140 (step S309).

The service site 140 verifies the signature (step S310).

The service site 140 notifies the authentication app 112 of authentication completion (step S311).

The authentication app 112 sends a completion notification to the user (step S312).

Exchange of Certificate

A certificate exchange sequence is to exchange and store an owner certificate between coordinated terminals.

The certificate exchange sequence is a specific example of the operation "only specific terminals are coordinated" in (4) described in the operation overview. Because the model in which a server accepts communication from a majority of unidentified clients is not employed as a prerequisite, exchange, verification, and comparison of the owner certificate between the terminals will be performed in advance, rather than at the time of coordination. This operation needs to be performed bidirectionally between a coordinated terminal pair (the existing terminal A110 and the new terminal B120).

Figure 8:
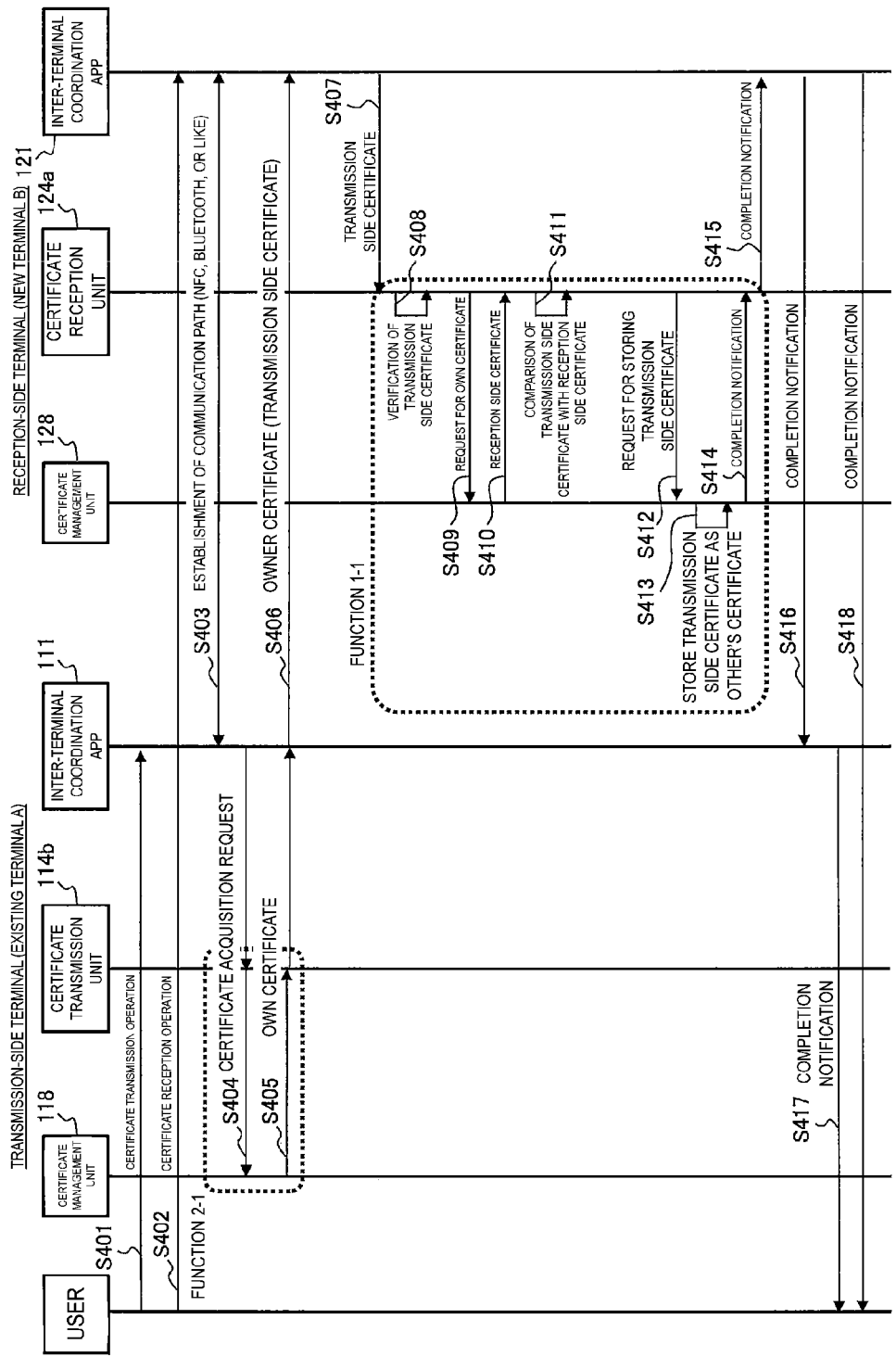
FIG. 8 is a diagram illustrating a sequence of exchanging certificates in the terminal registration system according to the present embodiment.

FIG. 8 is a diagram illustrating a certificate exchange sequence.

The transmission side terminal may be either the existing terminal A or the new terminal B, and the reception side terminal may be either the existing terminal A or the new terminal B (i.e., the other side of the terminal selected as the transmission side terminal). FIG. 8 illustrates an example in which the existing terminal A110 of FIG. 1 is used as the transmission side terminal and the new terminal B120 of FIG. 1 is used as the reception side terminal.

The user performs an operation of transmitting a certificate to the inter-terminal coordination app 111 of the existing terminal A110 (step S401), and performs an operation of receiving a certificate with respect to the inter-terminal coordination app 121 of the new terminal B120 (step S402).

The inter-terminal coordination app 121 of the new terminal B120 establishes a communication path based on NFC, Bluetooth, or the like between the inter-terminal coordination app 121 and the inter-terminal coordination app 111 of the existing terminal A110 (step S403).

The inter-terminal coordination app 111 of the existing terminal A110 transmits a certificate acquisition request to the certificate management unit 118 via the certificate transmission unit 114b (step S404).

The certificate management unit 118 of the existing terminal A110 issues an own certificate to the inter-terminal coordination app 111 via the certificate transmission unit 114b (step S405). The above-described operation of the certificate transmission unit 114b transmitting the certificate acquisition request to the certificate management unit 118 and the operation of the certificate management unit 118 issuing the own certificate to the certificate transmission unit 114b (see the function 2-1 surrounded by the dashed line in FIG. 8) corresponds to the "function 2-1" operation of the certificate transmission unit 114b in FIG. 1.

The inter-terminal coordination app 111 of the existing terminal A110 sends an owner certificate (transmission side certificate) to the inter-terminal coordination app 121 of the new terminal B120 based on the own certificate issued by the certificate management unit 118 (step S406).

The inter-terminal coordination app 121 of the new terminal B120 sends, to the certificate reception unit 124a of the new terminal-side coordination unit 124, the transmission side certificate transmitted from the inter-terminal coordination app 121 of the new terminal B120 (step S407).

The certificate reception unit 124a verifies the transmission side certificate (step S408).

The certificate reception unit 124a sends a request for an own certificate to certificate management unit 128 (step S409).

The certificate management unit 128 sends a reception side certificate to the certificate reception unit 124a (step S410).

The certificate reception unit 124a compares the transmission side certificate with the reception side certificate (step S411). The transmission side certificate is compared with the reception side certificate by determining whether a predetermined owner match condition is met, like whether common name (CN) values match.

The certificate reception unit 124a sends a storage request for the transmission side certificate to the certificate management unit 128 (step S412).

The certificate management unit 128 stores the transmission side certificate as the other's certificate (step S413).

The certificate management unit 128 sends a completion notification to the certificate reception unit 124a (step S414).

The operation of the function 1-1 surrounded by the dashed line box in FIG. 8 corresponds to the "function 1-1" operation of the certificate reception unit 124a of the new terminal B120 in FIG. 1.

The certificate reception unit 124a sends a completion notification to the inter-terminal coordination app 121 (step S415).

The inter-terminal coordination app 121 transmits a completion notification to the inter-terminal coordination app 111 of the existing terminal A110 (step S416).

The inter-terminal coordination app 111 of the existing terminal A110 transmits a completion notification to the user (step S417).

The inter-terminal coordination app 121 of the new terminal B120 transmits a completion notification to the user (step S418).

Inter-Terminal Coordination

The inter-terminal coordination is coordinating the terminals to achieve secure inter-terminal duplication of an authentication private key.

Figure 9:
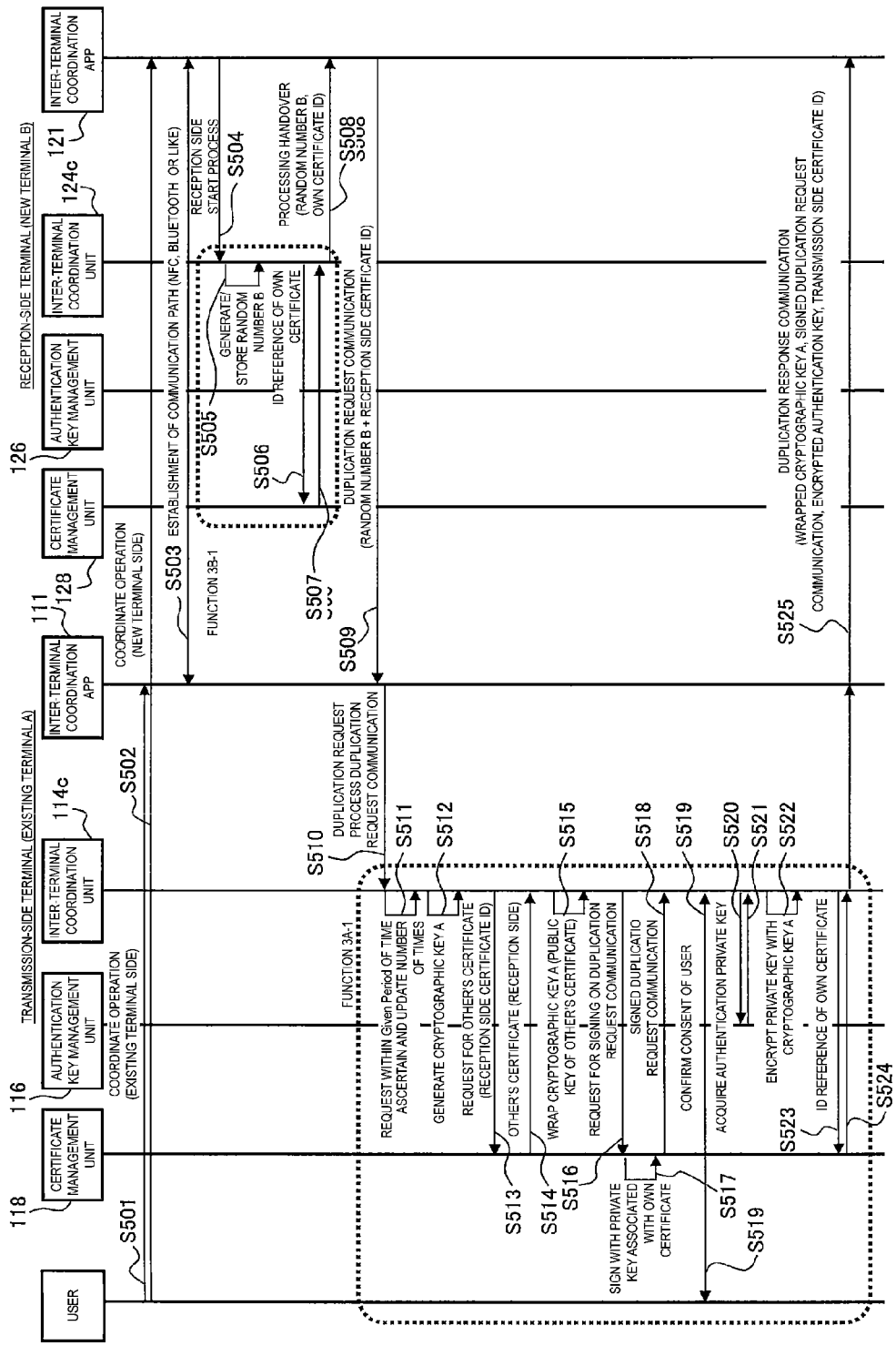
FIG. 9 is a diagram illustrating a sequence of inter-terminal coordination in the terminal registration system according to the present embodiment.
Figure 10:
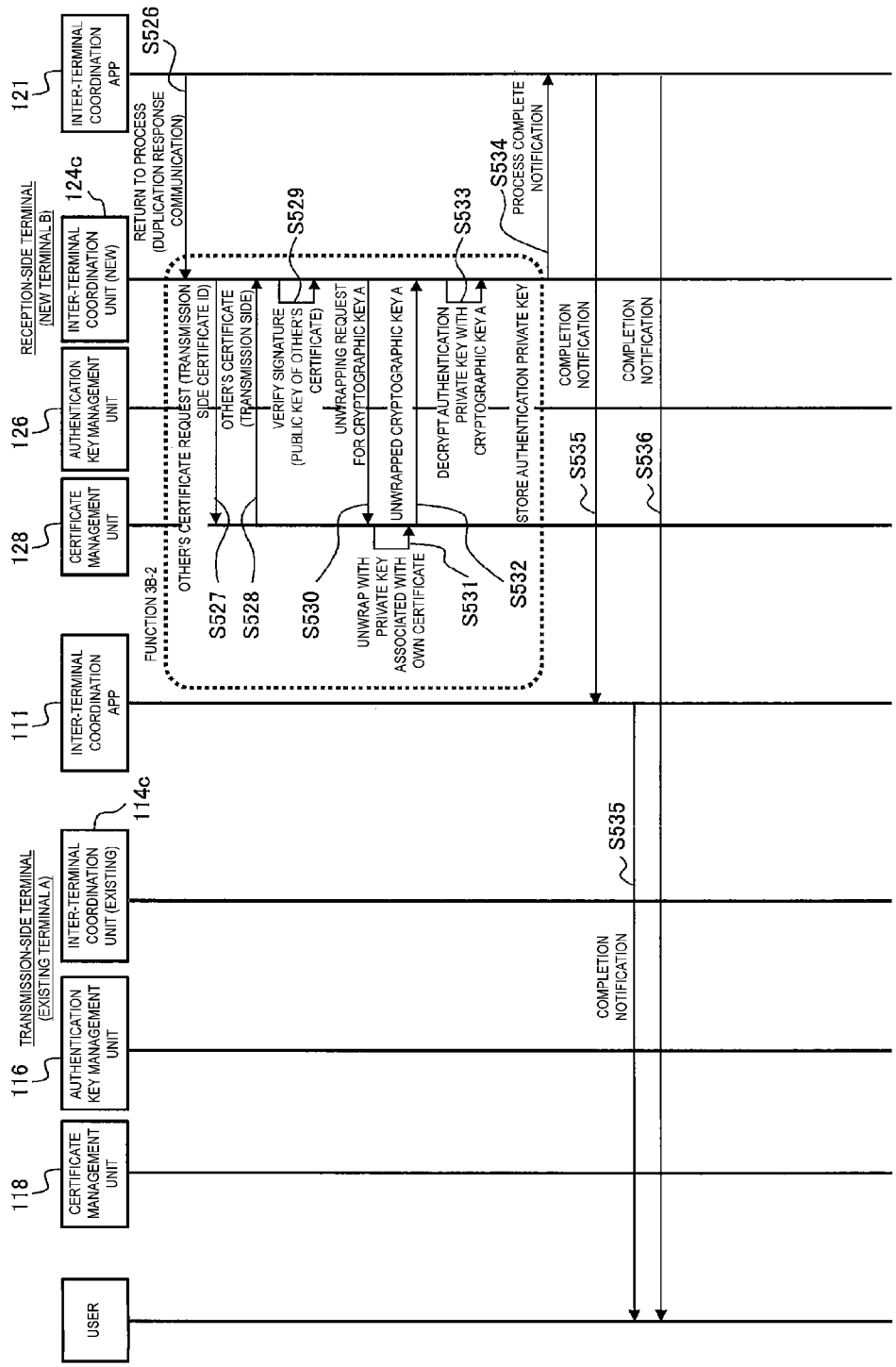
FIG. 10 is a sequence diagram following FIG. 9.

FIGS. 9 and 10 are diagrams illustrating a sequence of inter-terminal coordination. FIG. 10 is a sequence diagram following FIG. 9.

A transmission side terminal is the existing terminal A, and a reception side terminal is the new terminal B.

As illustrated in FIG. 9, the user performs a coordination operation to the inter-terminal coordination app 111 of the existing terminal A110 (e.g., an operation to activate the inter-terminal coordination app) (step S501), and performs a coordination operation to the inter-terminal coordination app 121 of the new terminal B120 (step S502).

The inter-terminal coordination app 121 of the new terminal B120 establishes a communication path based on NFC, Bluetooth, or the like between the inter-terminal coordination app 121 and the inter-terminal coordination app 111 of the existing terminal A110 (step S503).

The inter-terminal coordination app 121 of the new terminal B120 requests a reception side start process from the inter-terminal coordination unit 124c of the new terminal-side coordination unit 124 (step S504).

The inter-terminal coordination unit 124c generates/retains a random number B (step S505).

The inter-terminal coordination unit 124c requests the own certificate ID reference from the certificate management unit 128 (step S506).

The certificate management unit 128 sends the result of the own certificate ID reference to the inter-terminal coordination unit 124c (step S507).

The operation of the inter-terminal coordination unit 124c to generate/retain the random number B and to request the own certificate ID reference from the certificate management unit 128, and the certificate management unit 128 to send the result of the own certificate ID reference to the inter-terminal coordination unit 124c (see the function 3B-1 surrounded the dashed line box in FIG. 9) corresponds to the "function 3B-1" operation of the inter-terminal coordination unit 124c of FIG. 1.

The inter-terminal coordination unit 124c hands over processing for the random number B and the own certificate ID to the inter-terminal coordination app 121 (step S508).

The inter-terminal coordination app 121 of the new terminal B120 performs duplication request communication for the random number B and the reception side certificate ID on the inter-terminal coordination app 111 of the existing terminal A110 (step S509).

The inter-terminal coordination app 111 of the existing terminal A110 performs the duplication request process (duplication request communication) on the inter-terminal coordination unit 114c of the existing terminal-side coordination unit 114 (step S510).

Hereinafter, the inter-terminal coordination unit 114c executes the function 3A-1 operation indicated by the dashed line box of FIG. 9. This function 3A-1 operation corresponds to the "function 3A-1" operation of the inter-terminal coordination unit 114c in FIG. 1. In other words, the inter-terminal coordination unit 114c ascertains and updates the number of requests made within a given period of time (step S511). Note that a quasi-normal process performed when the number of requests exceeds a threshold will be described below in FIG. 11.

The inter-terminal coordination unit 114c generates a cryptographic key A (step S512).

The inter-terminal coordination unit 114c requests the other's certificate (reception side certificate ID) from the certificate management unit 118 (step S513).

The certificate management unit 118 sends the other's certificate (reception side) to the inter-terminal coordination unit 114c (step S514).

The inter-terminal coordination unit 114c wraps the cryptographic key A with the public key of the other's certificate (step S515).

The inter-terminal coordination unit 114c sends a request for signing on the duplication request communication to the certificate management unit 118 (step S516).

The certificate management unit 118 signs with a private key associated with the own certificate (step S517).

The certificate management unit 118 performs signed duplication request communication with the inter-terminal coordination unit 114c (step S518).

The inter-terminal coordination unit 114c confirms a consent of the user from the user (step S519).

The inter-terminal coordination unit 114c sends a request for acquiring an authentication private key to the authentication key management unit 116 (step S520).

The authentication key management unit 116 sends the authentication private key for which acquisition has been requested to the inter-terminal coordination unit 114c (step S521).

The inter-terminal coordination unit 114c encrypts the private key with the cryptographic key A (step S522).

The inter-terminal coordination unit 114c requests the own certificate ID reference from the certificate management unit 118 (step S523).

The certificate management unit 118 sends the own certificate to the inter-terminal coordination unit 114c (step S524).

The operation of the inter-terminal coordination unit 114c to ascertain and update the number of requests made within a given period of time (step S511) to the operation of the inter-terminal coordination unit 114c to accept the own certificate from the certificate management unit 118 (step S524) (see the function 3A-1 surrounded by the dashed line box in FIG. 9) correspond to the "function 3A-1" operation of the inter-terminal coordination unit 114c in FIG. 1.

The inter-terminal coordination unit 114c performs duplication response communication in which the wrapped cryptographic key A, the signed duplication request communication, the encrypted authentication key, and the transmission side certificate ID are sent to the inter-terminal coordination app 121 of the new terminal B120 via the inter-terminal coordination app 111 (step S525).

As illustrated in FIG. 10, the inter-terminal coordination app 121 of the new terminal B120 causes the inter-terminal coordination unit 124c to return to the process for the duplication response communication (step S526).

Hereinafter, the inter-terminal coordination unit 124c performs a function 3B-2 operation indicated by the dashed line box of FIG. 10. This function 3B-2 operation corresponds to the "function 3B-2" operation of the inter-terminal coordination unit 124c in FIG. 1. In other words, the inter-terminal coordination unit 124c requests the other's certificate (transmission side certificate ID) from the certificate management unit 128 (step S527).

The certificate management unit 128 sends the other's certificate (transmission side) to the inter-terminal coordination unit 124c (step S528).

The inter-terminal coordination unit 124c verifies the signature with the public key of the other's certificate (step S529).

The inter-terminal coordination unit 124c sends an unwrapping request for the cryptographic key A to the certificate management unit 128 (step S530).

The certificate management unit 128 unwraps the cryptographic key with a private key associated with the own certificate (step S531).

The certificate management unit 128 decrypts the authentication private key with the cryptographic key A (step S532).

The certificate management unit 128 stores the authentication private key (step S533).

The operation of the inter-terminal coordination unit 124c to request the other's certificate (transmission side certificate ID) (step S527) to the operation of the inter-terminal coordination unit 124c to store the authentication private key (step S533) (see the function 3B-2 indicated by the dashed line box in FIG. 9) corresponds to the "function 3B-2" operation of the inter-terminal coordination unit 124c in FIG. 1.

The inter-terminal coordination unit 124c sends a process completion notification to the inter-terminal coordination app 121 (step S533).

The inter-terminal coordination app 121 transmits a completion notification to the inter-terminal coordination app 111 of the existing terminal A110 (step S534).

The inter-terminal coordination app 111 of the existing terminal A110 transmits a completion notification to the user (step S535).

The inter-terminal coordination app 121 of the new terminal B120 transmits a completion notification to the user (step S536).

The "exchange of certificates" (see FIG. 8) and "inter-terminal coordination" (see FIGS. 9 and 10) have been described above.

Processing Method when Threshold is Exceeded

Next, a processing method when the threshold is exceeded will be described.

An attack to steal an authentication key by acquiring a large number of pieces of encrypted data and deducing the method of generating cryptographic keys is assumable.

In this embodiment, if the number of requests for duplicating an authentication key exceeds a predetermined threshold (e.g., up to three times in one hour, or the like), the requests are rejected.

On the other hand, there is a possibility of a user making errors in an operation, or the like, and thus a function of displaying a warning screen for the user at that point and allowing the user to select whether to proceed the operation is deployed in the TEE. The warning screen of the TEE cannot be tampered by malware or the like, and thus the user's intention can be securely ascertained. At this time, it is preferable to increase reliability further by deploying a function of securely receiving and verifying input of credential (pin input, presentation of biometric information, or the like) that only a pre-registered user can hold in the TEE.

Figure 11:
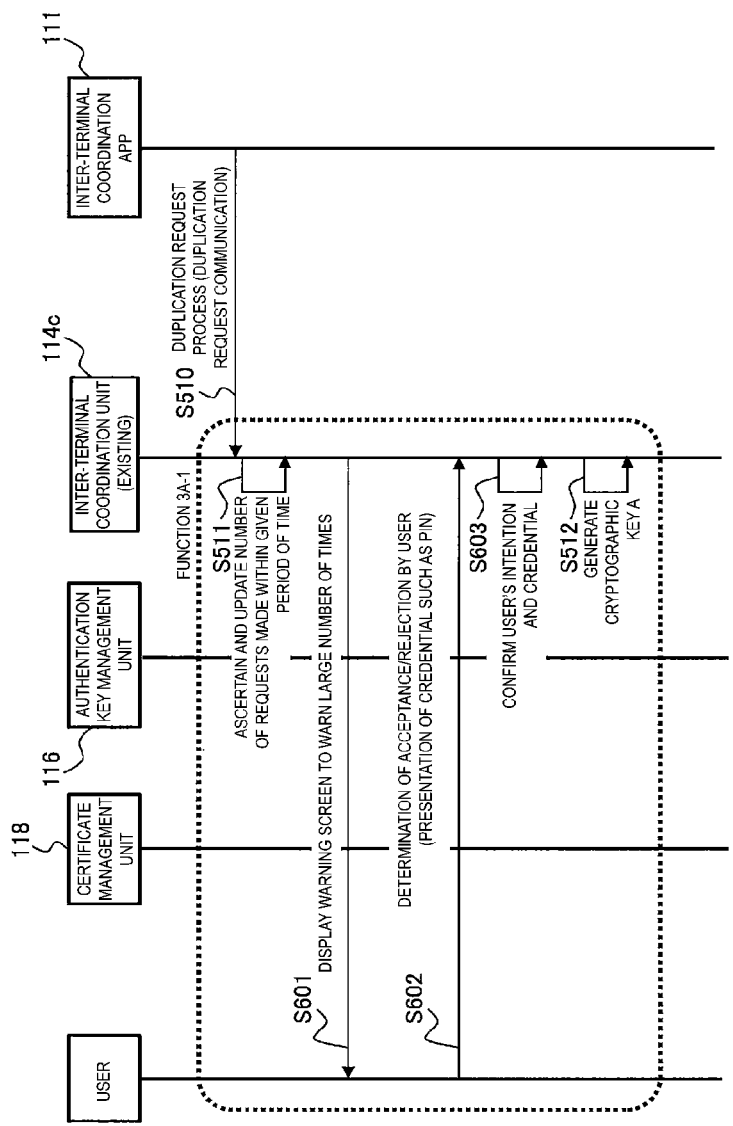
FIG. 11 is a diagram illustrating a sequence of inter-terminal coordination to which a process performed when the threshold is exceeded in the terminal registration system according to the present embodiment is applied.

FIG. 11 is a diagram illustrating a sequence of an inter-terminal coordination to which the process performed when the threshold is exceeded is applied. The same reference numbers are given to steps in which the same processing as that in FIG. 9 is performed. Because the process performed when the threshold is exceeded is a process performed by the transmission side terminal, FIG. 11 illustrates the excerpted sequence of the transmission side terminal (existing terminal A) in FIG. 9.

As illustrated in FIG. 11, the inter-terminal coordination app 111 of the existing terminal A110 performs a duplication request process (duplication request communication) on the inter-terminal coordination unit 114c of the existing terminal-side coordination unit 114 (step S510).

The inter-terminal coordination unit 114c executes the function 3A-1 operation indicated by the dashed line box of FIG. 11. This function 3A-1 operation corresponds to the "function 3A-1" operation of the inter-terminal coordination unit 114c in FIG. 1. In other words, the inter-terminal coordination unit 114c ascertains and updates the number of requests made within a given period of time (step S511).

The inter-terminal coordination unit 114c displays a warning screen for the user to warn a large number of requests made within the given period of time (step S601).

The inter-terminal coordination unit 114c receives a determination of acceptance/rejection by the user (presentation of credential such as a pin) (step S602).

The inter-terminal coordination unit 114c confirms the user's intention and credential (step S603).

Hereinafter, a similar process to the "function 3A-1" operation of the inter-terminal coordination unit 114c in FIG. 9 is performed.

Naming Function

Next, a naming function will be described.

A function for a user to securely give a name by which a terminal can be easily identifiable when the other's certificate is acquired is installed in the TEE.

Figure 12:
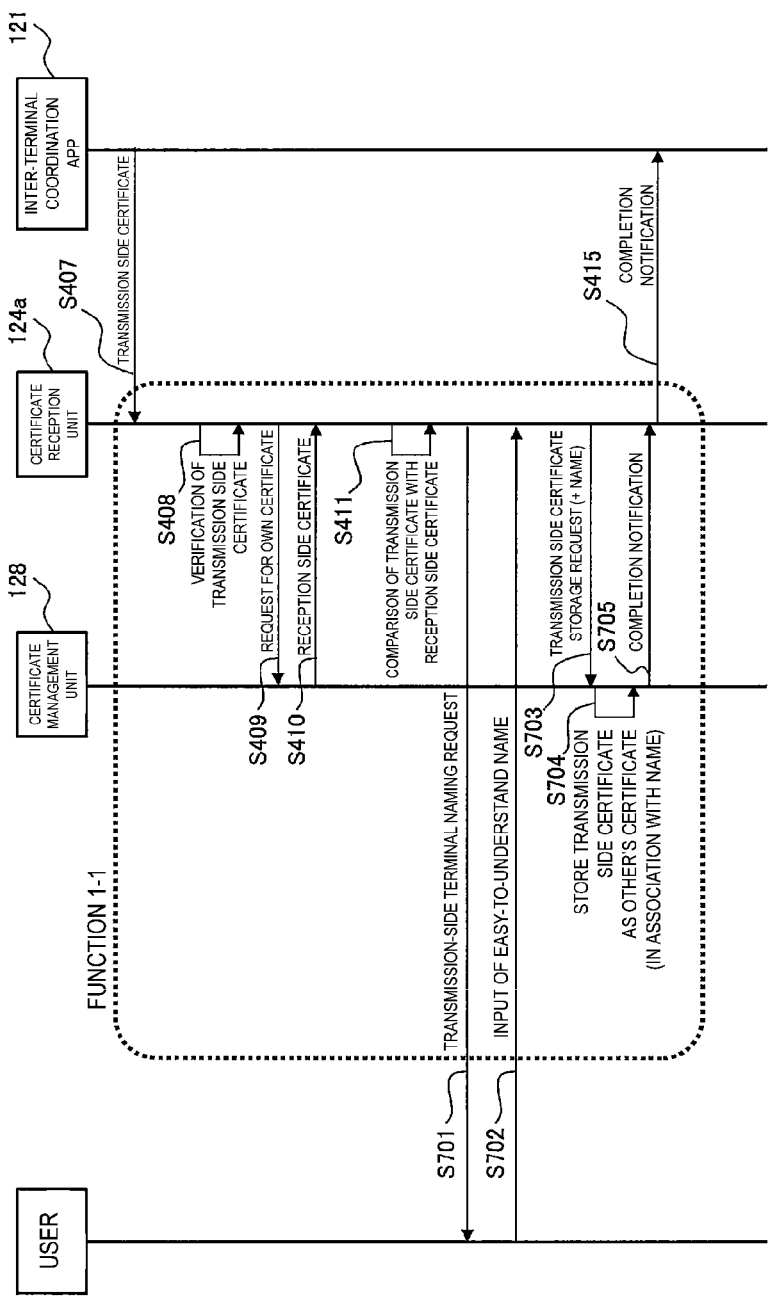
FIG. 12 is a diagram illustrating a sequence of exchanging certificates to which a naming function of the terminal registration system according to the present embodiment is applied.

FIG. 12 is a diagram illustrating a sequence of exchange of certificates to which the naming function is applied. The same reference numbers are given to steps in which the same processing as that in FIG. 8 is performed. Because the process of the naming function is a process performed by the reception side terminal, FIG. 12 illustrates the excerpted sequence of the reception side terminal (new terminal B120) of FIG. 8.

The operation of the function 1-1 surrounded by the dashed line box in FIG. 12 corresponds to the "function 1-1" operation of the certificate reception unit 124a of the new terminal B120 in FIG. 1.

The certificate reception unit 124a confirms that the predetermined owner match condition is met (the CN values match, or the like) and compares the transmission side certificate with the reception side certificate (step S411).

The certificate reception unit 124a sends a naming request of the transmission side terminal to the user (step S701).

The certificate reception unit 124a accepts input of the easy-to-understand name from the user (step S702).

The certificate reception unit 124a sends, to the certificate management unit 128, a storage request for a transmission side certificate to which the easy-to-understand name has been given (step S703).

The certificate management unit 128 stores the transmission side certificate in association with a name as the other's certificate (step S704).

The certificate management unit 128 sends a completion notification to the certificate reception unit 124a (step S705).

Identifying Unintended Terminal

If a function of securely notifying a user of the partner terminal during the coordination process is installed in the TEE, it is easy to recognize an attempt to coordination with unintended terminals.

Figure 13:
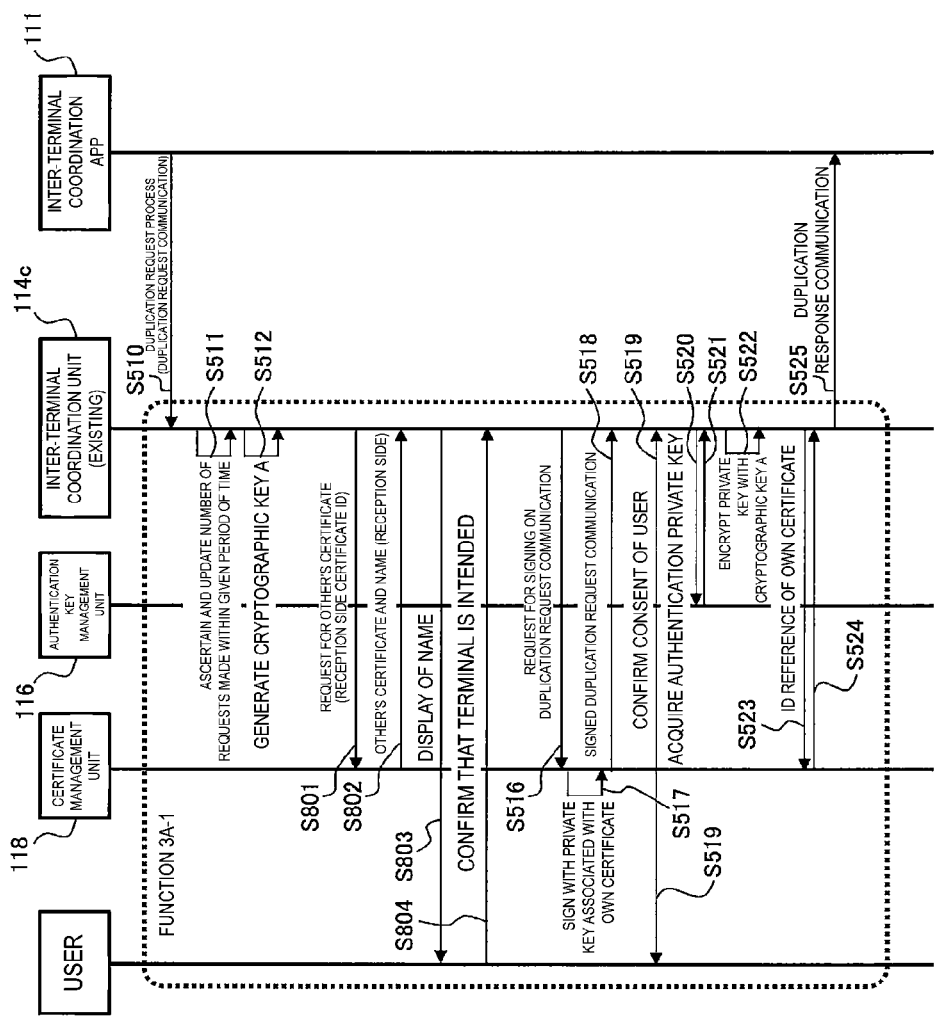
FIG. 13 is a diagram illustrating a sequence of inter-terminal coordination in the terminal registration system according to the present embodiment to which an unintended terminal identification process is applied.
Figure 14:
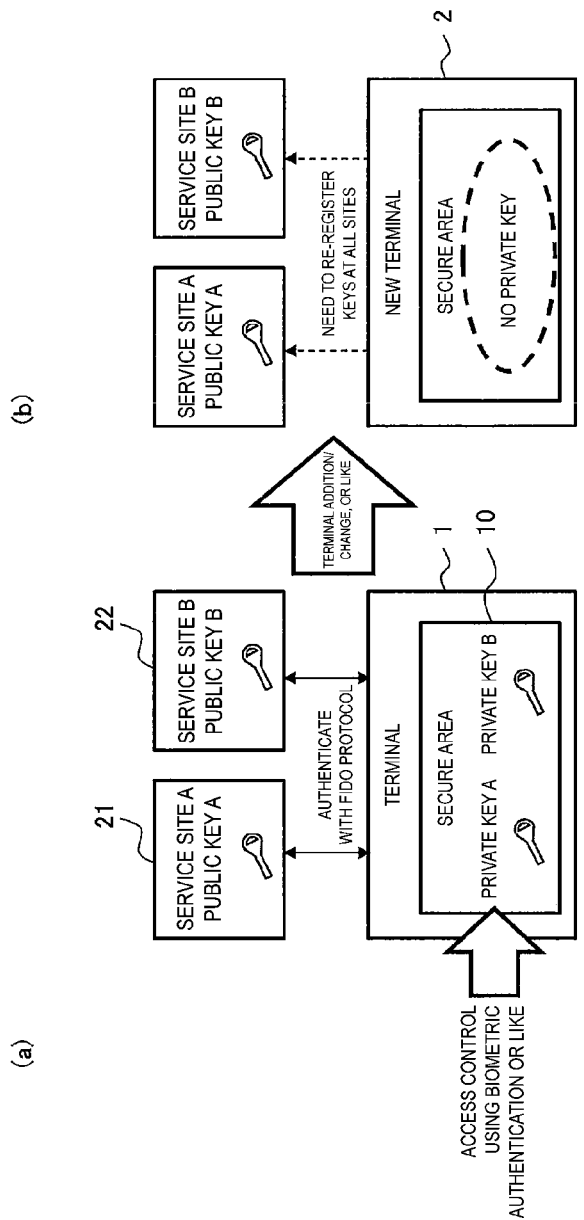
FIG. 14 illustrates diagrams for describing characteristics of the standard technology (FIDO), in which (a) illustrates authentication of a terminal, and (b) illustrates registration of a new terminal.
Figure 15:
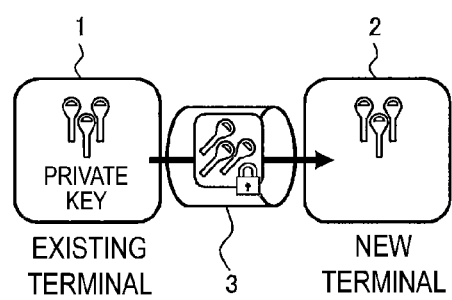
FIG. 15 is a diagram for describing a technology of copying an authentication key (first method) by using inter-terminal coordination.
Figure 16:
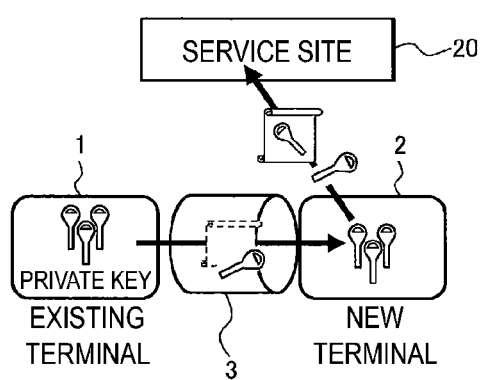
FIG. 16 is a diagram for describing a registration authorization technology (second method) using a grant of an electronic signature.
Figure 17:
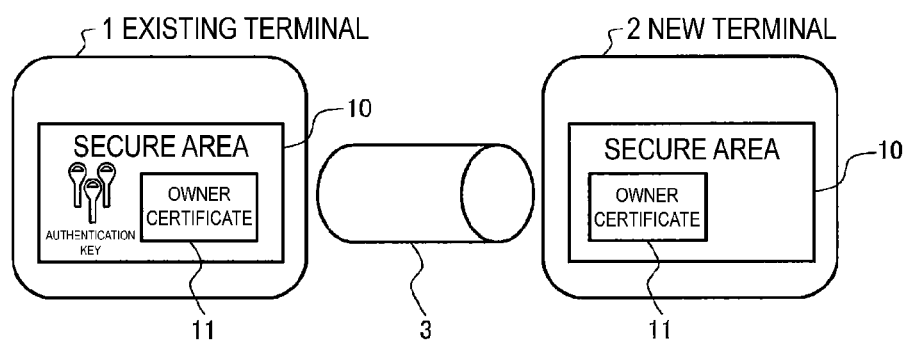
FIG. 17 is a diagram for describing third method for allowing only terminals having the identical owner certificate to be coordinated.

FIG. 13 is a diagram illustrating a sequence of an inter-terminal coordination to which an unintended terminal identification process is applied. The same reference numbers are given to steps in which the same processing as that in FIG. 9 is performed. Because the unintended terminal identification process is a process performed by the transmission side terminal, FIG. 13 illustrates the excerpted sequence of the transmission side terminal (existing terminal A) in FIG. 9.

The function 3A-1 operation illustrated in FIG. 11 corresponds to the "function 3A-1" operation of the inter-terminal coordination unit 114c of FIG. 1. In other words, the inter-terminal coordination unit 114c sends a request for an other's certificate (reception side certificate ID) to the certificate management unit 118 (step S801).

The certificate management unit 118 sends the other's certificate and the name (of the reception side) to the inter-terminal coordination unit 114c (step S802).

The inter-terminal coordination unit 114c displays the name of the terminal to the user (step S803).

The inter-terminal coordination unit 114c confirms that the terminal is intended from the user (step S804).

As described above, the terminal registration system 1000 according to the present embodiment includes the existing terminal A110 including a certificate issuing unit 117 that issues, to a secure area including the TEE, an owner certificate indicating the owner of the terminal, an existing terminal-side coordination unit 114 that coordinates terminals having identical owner certificate identical to the issued owner certificate and generates a cryptographic key, an authentication key management unit 116 that manages an authentication private key, and an inter-terminal coordination app 111 that performs inter-terminal communication in a terminal environment including the REE, the new terminal B120 makes a request for starting encrypted communication using the cryptographic key to the existing terminal A110, from the inter-terminal coordination app 121 on the new terminal B120 side, and the existing terminal-side coordination unit 114 of the existing terminal A110 sends coordination data with the authentication private key encrypted with the cryptographic key to the new terminal B120 having the identical owner certificate.

With this configuration, the number of communication operations between the terminals can be reduced compared to that in TLS. For example, in one operation (inter-terminal certificate exchange process/inter-terminal coordination process), the required number of communication operations is at most one round-trip between terminals. Thus, the number of states in the TEE taking a context switch to the REE into account is reduced.

Note that, all or some of the processes described as being performed automatically among the processes described in the present embodiment can be performed manually, or all or some of the processes described as being performed manually can be performed automatically by a known method. In addition, information including the processing procedures, the control procedures, the specific names, and the various types of data, and various parameters described in this specification and drawings can be modified as desired except in the case specifically noted.

Each element of each apparatus illustrated is a functional concept and does not necessarily need to be physically configured as illustrated. That is, the specific modes of dispersion and integration of the devices are not limited to those illustrated and all or some of the devices can be configured such that they are functionally or physically dispersed or integrated in any units according to various loads, use conditions, or the like.

In addition, each of the configurations, functions, processing units, processing means, and the like described above may be partially or entirely realized in hardware, for example, by designing them in an integrated circuit. Each of the configurations, the functions, and the like may be realized in software for a processor to interpret and execute a program that implements the functions. Information such as a program, a table, and a file for realizing each function can be held in a recording device such as a memory, a hard disk, or a solid state drive (SSD) or a recording medium such as an integrated circuit (IC) card, a secure digital (SD) card, or an optical disc.

REFERENCE SIGNS LIST

110 Existing terminal A (registered terminal)
111,121 Inter-terminal coordination app (communication unit)
112 Authentication APP
113 Certificate issuing app
114 Existing terminal-side coordination unit
114a Certificate reception unit
114b Certificate transmission unit
114c Inter-terminal coordination Unit
115,125 Authentication unit
116,126 Authentication key management unit
117,127 Certificate issuing unit
118,128 Certificate management unit
120 New terminal B
124 New terminal-side coordination unit
130 Authentication station
140 Service site
1000 Terminal registration system

The invention claimed is:

1. A terminal registration system comprising a plurality of terminals to be authenticated with Fast Identity Online (FIDO) using a private key are communicatively connected to a service site that is utilized by the terminals, wherein the plurality of terminals include a new terminal and a registered terminal, and the new terminal is registered in a plurality of the service sites using the registered terminal, wherein:
 each of the terminals includes one or more processors and is configured to:
  issue an owner certificate indicating an owner of the terminal and store the owner certificate in a secure area including a Trusted Execution Environment (TEE),
  manage an authentication private key, and
  perform inter-terminal communication in a terminal environment including a Rich Execution Environment (REE);
 the new terminal is configured to send a request for starting encrypted communication to the registered terminal;
 the registered terminal is configured to, after receiving the request from the new terminal and without transmitting the owner certificate of the registered terminal to the new terminal: generate a cryptographic key, wrap the cryptographic key with a public key that is associated with the owner certificate of the new terminal, and send the wrapped cryptographic key to the new terminal;
 the new terminal is further configured to: after receiving the wrapped cryptographic key from the registered terminal, unwrap the cryptographic key with a private key associated with the owner certificate of the new terminal; and
 the registered terminal is further configured to, without notifying of start of encrypted communication, send coordination data with the authentication private key encrypted with the cryptographic key to the new terminal.

2. The terminal registration system according to claim 1, wherein the registered terminal stores a threshold for determining the number of communication start requests made within a predetermined period of time, and
the registered terminal does not send the coordination data when the number of communication start requests from the new terminal exceeds the threshold.

3. The terminal registration system according to claim 1, wherein the registered terminal is configured to send the coordination data without confirming that the cryptographic key is available on the new terminal side.

4. The terminal registration system according to claim 2, wherein the registered terminal is configured to give a notification to a user when the number of communication start requests from the new terminal exceeds the threshold, and receive a determination of acceptance or rejection by the user.

5. The terminal registration system according to claim 1, wherein, at the time of a coordination process, the registered terminal is configured to notify a user of the new terminal under the coordination process.

6. The terminal registration system according to claim 1, wherein the registered terminal is configured to store a name of the new terminal named by a user in association with the owner certificate.

7. A terminal registration method of a terminal registration system in which a plurality of terminals to be authenticated with Fast Identity Online (FIDO) using a private key are communicatively connected to a service site that is utilized by the terminals, wherein the plurality of terminals include a new terminal and a registered terminal and the new terminal is registered in a plurality of the service sites using the registered terminal,
 wherein each of the terminals includes one or more processors and is configured to:
  issue an owner certificate indicating an owner of the terminal and store the owner certificate in a secure area including a Trusted Execution Environment (TEE),
  manage an authentication private key, and
  perform inter-terminal communication in a terminal environment including a Rich Execution Environment (REE);
 the method including:
 by the new terminal, sending a request for starting encrypted communication to the registered terminal;
 by the registered terminal, after receiving the request from the new terminal and without transmitting the owner certificate of the registered terminal to the new terminal: generating a cryptographic key, wrapping the cryptographic key with a public key that is associated with the owner certificate of the new terminal, and sending the wrapped cryptographic key to the new terminal;

by the new terminal: after receiving the wrapped cryptographic key from the registered terminal, unwrapping the cryptographic key with a private key associated with the owner certificate of the new terminal; and by the registered terminal, without notifying of start of encrypted communication, sending coordination data with the authentication private key encrypted with the cryptographic key to the new terminal.

8. The terminal registration method according to claim 7, wherein the registered terminal stores a threshold for determining the number of communication start requests made within a predetermined period of time, and the registered terminal does not send the coordination data when the number of communication start requests from the new terminal exceeds the threshold.

9. The terminal registration method according to claim 7, further comprising:

by the registered terminal, sending the coordination data without confirming that the cryptographic key is available on the new terminal side.

10. The terminal registration method according to claim 8, further comprising:

by the registered terminal, giving a notification to a user when the number of communication start requests from the new terminal exceeds the threshold; and by the registered terminal, receiving a determination of acceptance or rejection by the user.

11. The terminal registration method according to claim 7, further comprising:

at the time of a coordination process, notifying, by the registered terminal, a user of the new terminal under the coordination process.

12. The terminal registration method according to claim 7, further comprising:

by the registered terminal, storing a name of the new terminal named by a user in association with the owner certificate.

* * * * *